US008654061B2

(12) United States Patent
Mienko et al.

(10) Patent No.: US 8,654,061 B2
(45) Date of Patent: Feb. 18, 2014

(54) INTEGRATED FRONT LIGHT SOLUTION

(75) Inventors: Marek Mienko, San Jose, CA (US); Gang Xu, Cupertino, CA (US); Ion Bita, San Jose, CA (US); Lai Wang, Milpitas, CA (US); Russell W. Gruhlke, Milpitas, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 893 days.

(21) Appl. No.: 12/343,279

(22) Filed: Dec. 23, 2008

(65) Prior Publication Data

US 2009/0201301 A1    Aug. 13, 2009

Related U.S. Application Data

(60) Provisional application No. 61/028,127, filed on Feb. 12, 2008.

(51) Int. Cl.
*G09G 3/36*    (2006.01)
(52) U.S. Cl.
USPC ............................ 345/102; 362/600; 362/615
(58) Field of Classification Search
USPC .................. 345/102; 362/600, 606, 608–628
See application file for complete search history.

(56) References Cited

U.S. PATENT DOCUMENTS

| | | |
|---|---|---|
| 3,924,929 A | 12/1975 | Holmen |
| 4,282,862 A | 8/1981 | Soleau |
| 4,375,312 A | 3/1983 | Tangonan |
| 4,378,567 A | 3/1983 | Mir |
| 4,915,479 A | 4/1990 | Clarke |

(Continued)

FOREIGN PATENT DOCUMENTS

| | | |
|---|---|---|
| CN | 1381752 A | 11/2002 |
| CN | 1639596 A | 7/2005 |

(Continued)

OTHER PUBLICATIONS

PCT International Search Report and Written Opinion for International Application No. PCT/US2009/033597, dated Sep. 10, 2009.

(Continued)

*Primary Examiner* — Regina Liang
(74) *Attorney, Agent, or Firm* — Knobbe, Martens, Olson & Bear LLP

(57) ABSTRACT

An integrated illumination apparatus includes a light injection portion having a first end for receiving light from a light source. The light injection portion includes material that supports propagation of said light along the length of the light injection portion. Turning microstructure is disposed on a first side of the light injection. The turning microstructure is configured to turn at least a substantial portion of light incident on the first side and to direct the portion of the light out a second opposite side of the light injection portion. A slit is disposed along the length of the light injection portion. The slit forms an optical interface on the second opposite side of the light injection portion that provides total internal reflection for light propagating along the length of the light injection portion to be guided therein. The optical interface further transmits light turned by said turning microstructure. A light distribution portion is disposed with respect to the slit to receive the light turned by said turning microstructure and transmitted out of the second side of the light injection portion and through said slit. At least one bridge is disposed between light injection portion and the light distribution portion. The bridge mechanically connects the light injection portion to the light distribution portion.

48 Claims, 13 Drawing Sheets

(56) References Cited

U.S. PATENT DOCUMENTS

| | | |
|---|---|---|
| 4,918,577 A | 4/1990 | Furudate |
| 4,974,942 A | 12/1990 | Gross et al. |
| 5,050,946 A | 9/1991 | Hathaway |
| 5,206,747 A | 4/1993 | Wiley et al. |
| 5,221,982 A | 6/1993 | Faris |
| 5,226,099 A | 7/1993 | Mignardi et al. |
| 5,283,674 A | 2/1994 | Hanaoka et al. |
| 5,339,179 A | 8/1994 | Rudisill |
| 5,452,385 A | 9/1995 | Izumi |
| 5,481,385 A | 1/1996 | Zimmerman et al. |
| 5,497,293 A | 3/1996 | Noguchi et al. |
| 5,515,184 A | 5/1996 | Caulfield |
| 5,555,160 A | 9/1996 | Tawara |
| 5,592,332 A | 1/1997 | Nishio et al. |
| 5,647,036 A | 7/1997 | Deacon |
| 5,664,862 A | 9/1997 | Redmond et al. |
| 5,671,994 A | 9/1997 | Tai |
| 5,673,128 A | 9/1997 | Ohta et al. |
| 5,712,694 A | 1/1998 | Taira et al. |
| 5,764,315 A | 6/1998 | Yokota et al. |
| 5,771,321 A | 6/1998 | Stern |
| 5,783,614 A | 7/1998 | Chen et al. |
| 5,808,708 A | 9/1998 | Oyama et al. |
| 5,845,035 A | 12/1998 | Wimberger-Friedl |
| 5,892,598 A | 4/1999 | Asakawa et al. |
| 5,913,594 A | 6/1999 | Iimura |
| 5,914,760 A | 6/1999 | Daiku |
| 5,956,106 A | 9/1999 | Petersen |
| 6,021,007 A | 2/2000 | Murtha |
| 6,023,373 A | 2/2000 | Inoguchi et al. |
| 6,040,937 A | 3/2000 | Miles |
| 6,068,382 A | 5/2000 | Fukui et al. |
| 6,074,069 A | 6/2000 | Chao-Ching |
| 6,099,134 A | 8/2000 | Taniguchi |
| 6,128,077 A | 10/2000 | Jovin et al. |
| 6,151,089 A | 11/2000 | Yang et al. |
| 6,195,196 B1 | 2/2001 | Kimura et al. |
| 6,259,082 B1 | 7/2001 | Fujimoto et al. |
| 6,259,854 B1 | 7/2001 | Shinji et al. |
| 6,273,577 B1 | 8/2001 | Goto |
| 6,283,602 B1 | 9/2001 | Kawaguchi et al. |
| 6,322,901 B1 | 11/2001 | Bawendi |
| 6,323,892 B1 | 11/2001 | Mihara |
| 6,368,885 B1 | 4/2002 | Offenberg et al. |
| 6,371,623 B1 | 4/2002 | Toyoda |
| 6,379,016 B1 | 4/2002 | Boyd et al. |
| 6,402,325 B1 | 6/2002 | Yamamoto |
| 6,407,785 B1 | 6/2002 | Yamazaki |
| 6,412,969 B1 | 7/2002 | Torihara |
| 6,421,103 B2 | 7/2002 | Yamaguchi |
| 6,431,716 B1 | 8/2002 | Kusakabe |
| 6,442,124 B1 | 8/2002 | Chung et al. |
| 6,454,452 B1 | 9/2002 | Sasagawa |
| 6,467,925 B2 | 10/2002 | Egawa et al. |
| 6,476,887 B1 | 11/2002 | Sekine et al. |
| 6,480,634 B1 | 11/2002 | Corrigan |
| 6,494,588 B1 | 12/2002 | Okada |
| 6,504,589 B1 | 1/2003 | Kashima |
| 6,512,626 B1 | 1/2003 | Schmidt |
| 6,522,373 B1 | 2/2003 | Hira et al. |
| 6,522,794 B1 | 2/2003 | Bischel |
| 6,527,410 B2 | 3/2003 | Yamaguchi |
| 6,540,368 B2 | 4/2003 | Akaoka |
| 6,561,661 B2 | 5/2003 | Egawa |
| 6,565,225 B2 | 5/2003 | Mabuchi et al. |
| 6,582,095 B1 | 6/2003 | Toyoda |
| 6,592,234 B2 | 7/2003 | Epstein |
| 6,598,987 B1 | 7/2003 | Parikka |
| 6,603,520 B2 | 8/2003 | Umemoto |
| 6,630,968 B1 | 10/2003 | Tsuchihashi et al. |
| 6,631,998 B2 | 10/2003 | Egawa et al. |
| 6,636,358 B2 | 10/2003 | Umemoto et al. |
| 6,642,913 B1 | 11/2003 | Kimura |
| 6,644,824 B2 | 11/2003 | Baba |
| 6,650,455 B2 | 11/2003 | Miles |
| 6,652,109 B2 | 11/2003 | Nakamura |
| 6,657,683 B2 | 12/2003 | Richard |
| 6,659,615 B2 | 12/2003 | Umemoto |
| 6,660,997 B2 | 12/2003 | Laberge et al. |
| 6,667,782 B1 | 12/2003 | Taira et al. |
| 6,669,350 B2 | 12/2003 | Yamashita |
| 6,674,562 B1 | 1/2004 | Miles |
| 6,680,792 B2 | 1/2004 | Miles |
| 6,685,342 B2 | 2/2004 | Terada |
| 6,697,403 B2 | 2/2004 | Lee et al. |
| 6,706,339 B1 | 3/2004 | Miyatake et al. |
| 6,709,123 B2 | 3/2004 | Flohr et al. |
| 6,742,907 B2 | 6/2004 | Funamoto et al. |
| 6,747,801 B2 | 6/2004 | Umemoto et al. |
| 6,751,023 B2 | 6/2004 | Umemoto et al. |
| 6,761,461 B2 | 7/2004 | Mizutani et al. |
| 6,773,126 B1 | 8/2004 | Hatjasalo |
| 6,778,746 B2 | 8/2004 | Charlton et al. |
| 6,798,469 B2 | 9/2004 | Kimura |
| 6,819,380 B2 | 11/2004 | Wen et al. |
| 6,862,141 B2 | 3/2005 | Olczak |
| 6,863,413 B1 | 3/2005 | Umemoto |
| 6,865,312 B2 | 3/2005 | Niv et al. |
| 6,879,354 B1 | 4/2005 | Sawayama |
| 6,883,924 B2 | 4/2005 | Maeda et al. |
| 6,883,934 B2 | 4/2005 | Kawakami |
| 6,891,530 B2 | 5/2005 | Umemoto et al. |
| 6,897,855 B1 | 5/2005 | Matthies |
| 6,927,811 B2 | 8/2005 | Jang |
| 6,930,816 B2 | 8/2005 | Mochizuki |
| 6,940,570 B1 | 9/2005 | Sumida et al. |
| 6,951,401 B2 | 10/2005 | Van Hees et al. |
| 6,960,010 B2 | 11/2005 | Matsumoto et al. |
| 6,961,045 B2 | 11/2005 | Tsao |
| 6,964,484 B2 | 11/2005 | Gupta |
| 7,001,060 B1 | 2/2006 | Kimura |
| 7,010,212 B2 | 3/2006 | Emmons et al. |
| 7,014,349 B2 | 3/2006 | Shinohara et al. |
| 7,040,796 B2 | 5/2006 | Sugiura et al. |
| 7,042,643 B2 | 5/2006 | Miles |
| 7,048,426 B2 | 5/2006 | Kao et al. |
| 7,056,001 B2 | 6/2006 | Chuang |
| 7,061,226 B2 | 6/2006 | Durr |
| 7,072,096 B2 | 7/2006 | Holman et al. |
| 7,073,933 B2 | 7/2006 | Gotoh et al. |
| 7,110,158 B2 | 9/2006 | Miles |
| 7,123,216 B1 | 10/2006 | Miles |
| 7,128,459 B2 | 10/2006 | Igarashi et al. |
| 7,133,022 B2 | 11/2006 | Grabert |
| 7,142,347 B2 | 11/2006 | Islam |
| 7,161,136 B1 | 1/2007 | Wenstrand et al. |
| 7,178,694 B2 | 2/2007 | Costa et al. |
| 7,178,964 B2 | 2/2007 | Sugiura et al. |
| 7,180,672 B2 | 2/2007 | Olczak |
| 7,186,014 B2 | 3/2007 | Shimura |
| 7,206,133 B2 | 4/2007 | Cassarly et al. |
| 7,212,345 B2 | 5/2007 | Wilson |
| 7,218,812 B2 | 5/2007 | Maxwell et al. |
| 7,221,418 B2 | 5/2007 | Lee et al. |
| 7,223,010 B2 | 5/2007 | Min et al. |
| 7,262,754 B1 | 8/2007 | Yamazaki |
| 7,278,772 B2 | 10/2007 | Kunimochi |
| 7,278,774 B2 | 10/2007 | Chang |
| 7,324,284 B2 | 1/2008 | Olczak |
| 7,327,510 B2 | 2/2008 | Cummings et al. |
| 7,346,251 B2 | 3/2008 | Bose |
| 7,352,501 B2 | 4/2008 | Chopra et al. |
| 7,357,552 B2 | 4/2008 | Takada |
| 7,357,557 B2 | 4/2008 | Miyashita |
| 7,360,899 B2 | 4/2008 | McGuire, Jr. et al. |
| 7,360,939 B2 | 4/2008 | Sugiura |
| 7,366,393 B2 | 4/2008 | Cassarly |
| 7,375,779 B2 | 5/2008 | Lee et al. |
| 7,377,678 B2 | 5/2008 | Huang |
| 7,380,969 B2 | 6/2008 | Yamashita |
| 7,400,439 B2 | 7/2008 | Holman |
| 7,417,784 B2 | 8/2008 | Sasagawa et al. |
| 7,450,295 B2 | 11/2008 | Tung et al. |
| 7,452,120 B2 | 11/2008 | Lee et al. |

(56) References Cited

U.S. PATENT DOCUMENTS

| | | |
|---|---|---|
| 7,477,809 B1 | 1/2009 | Tan et al. |
| 7,494,830 B2 | 2/2009 | Liu et al. |
| 7,520,642 B2 | 4/2009 | Holman et al. |
| 7,532,800 B2 | 5/2009 | Iimura |
| 7,545,569 B2 | 6/2009 | Cassarly |
| 7,561,133 B2 | 7/2009 | Mestha |
| 7,564,612 B2 | 7/2009 | Chui |
| 7,653,371 B2 | 1/2010 | Floyd |
| 7,663,714 B2 | 2/2010 | Haga et al. |
| 7,706,050 B2 | 4/2010 | Sampsell |
| 7,733,439 B2 | 6/2010 | Sampsell et al. |
| 7,750,886 B2 | 7/2010 | Sampsell |
| 7,766,498 B2 | 8/2010 | Sampsell |
| 7,766,531 B2 | 8/2010 | Anderson et al. |
| 7,855,827 B2 | 12/2010 | Xu et al. |
| 7,859,611 B2 | 12/2010 | Jang et al. |
| 7,864,395 B2 | 1/2011 | Chui |
| 7,872,394 B1 | 1/2011 | Gritters et al. |
| 7,965,350 B2 | 6/2011 | Tsuchiya et al. |
| 8,107,155 B2 | 1/2012 | Bita et al. |
| 2001/0003504 A1 | 6/2001 | Ishihara |
| 2001/0010630 A1 | 8/2001 | Umemoto |
| 2001/0019380 A1 | 9/2001 | Ishihara |
| 2001/0019479 A1 | 9/2001 | Nakabayashi |
| 2002/0006036 A1 | 1/2002 | Egawa |
| 2002/0008969 A1 | 1/2002 | Mabuchi et al. |
| 2002/0034071 A1 | 3/2002 | Mabuchi |
| 2002/0044445 A1 | 4/2002 | Bohler |
| 2002/0101551 A1 | 8/2002 | Akaoka |
| 2002/0106182 A1 | 8/2002 | Kawashima |
| 2002/0135560 A1 | 9/2002 | Akaoka |
| 2002/0154256 A1 | 10/2002 | Gotoh et al. |
| 2002/0176035 A1 | 11/2002 | Yamazaki |
| 2003/0012009 A1 | 1/2003 | Suzuki |
| 2003/0016930 A1 | 1/2003 | Inditsky |
| 2003/0026536 A1 | 2/2003 | Ho |
| 2003/0030764 A1 | 2/2003 | Lee |
| 2003/0034445 A1 | 2/2003 | Boyd et al. |
| 2003/0071947 A1 | 4/2003 | Shiraogawa et al. |
| 2003/0083429 A1 | 5/2003 | Smith et al. |
| 2003/0086030 A1 | 5/2003 | Taniguchi et al. |
| 2003/0086031 A1 | 5/2003 | Taniguchi et al. |
| 2003/0090887 A1 | 5/2003 | Igarashi |
| 2003/0095401 A1 | 5/2003 | Hanson |
| 2003/0098957 A1 | 5/2003 | Haldiman |
| 2003/0103344 A1 | 6/2003 | Niida |
| 2003/0123245 A1 | 7/2003 | Parker |
| 2003/0160919 A1 | 8/2003 | Suzuki |
| 2003/0165067 A1 | 9/2003 | Imamura |
| 2003/0169385 A1 | 9/2003 | Okuwaki |
| 2003/0193630 A1 | 10/2003 | Chiou |
| 2003/0210222 A1 | 11/2003 | Ogiwara et al. |
| 2003/0210367 A1 | 11/2003 | Nakano |
| 2003/0214728 A1 | 11/2003 | Olczak |
| 2003/0231483 A1 | 12/2003 | Higashiyama |
| 2004/0001169 A1 | 1/2004 | Saiki |
| 2004/0017599 A1 | 1/2004 | Yang |
| 2004/0027315 A1 | 2/2004 | Senda et al. |
| 2004/0042233 A1 | 3/2004 | Suzuki |
| 2004/0070711 A1 | 4/2004 | Wen |
| 2004/0080938 A1 | 4/2004 | Holman |
| 2004/0085748 A1 | 5/2004 | Sugiura |
| 2004/0100796 A1 | 5/2004 | Ward |
| 2004/0135494 A1 | 7/2004 | Miyatake |
| 2004/0170373 A1 | 9/2004 | Kim |
| 2004/0188599 A1 | 9/2004 | Viktorovitch |
| 2004/0228109 A1 | 11/2004 | Leu et al. |
| 2004/0228112 A1 | 11/2004 | Takata |
| 2004/0246743 A1 | 12/2004 | Lee |
| 2005/0002175 A1 | 1/2005 | Matsui et al. |
| 2005/0024849 A1 | 2/2005 | Parker |
| 2005/0024890 A1 | 2/2005 | Yamamoto et al. |
| 2005/0041175 A1 | 2/2005 | Akiyama |
| 2005/0046011 A1 | 3/2005 | Chen et al. |
| 2005/0062410 A1 | 3/2005 | Bell et al. |
| 2005/0069254 A1 | 3/2005 | Schultheis et al. |
| 2005/0088719 A1 | 4/2005 | Patel et al. |
| 2005/0185416 A1 | 8/2005 | Lee et al. |
| 2005/0206802 A1 | 9/2005 | Creemers |
| 2005/0231981 A1 | 10/2005 | Hoelen et al. |
| 2005/0248524 A1 | 11/2005 | Feng |
| 2005/0253980 A1 | 11/2005 | Saito et al. |
| 2005/0254771 A1 | 11/2005 | Yamashita et al. |
| 2005/0259302 A9 | 11/2005 | Metz et al. |
| 2005/0270798 A1 | 12/2005 | Lee et al. |
| 2005/0271325 A1 | 12/2005 | Anderson et al. |
| 2006/0002141 A1 | 1/2006 | Ouderkirk |
| 2006/0002675 A1 | 1/2006 | Choi et al. |
| 2006/0024017 A1 | 2/2006 | Page |
| 2006/0050032 A1 | 3/2006 | Gunner |
| 2006/0051048 A1 | 3/2006 | Gardiner |
| 2006/0061705 A1 | 3/2006 | Onishi |
| 2006/0062016 A1 | 3/2006 | Dejima |
| 2006/0066935 A1 | 3/2006 | Cummings |
| 2006/0072315 A1 | 4/2006 | Byung-Woong et al. |
| 2006/0072339 A1 | 4/2006 | Hsia-I et al. |
| 2006/0077122 A1 | 4/2006 | Gally et al. |
| 2006/0083028 A1 | 4/2006 | Yi-Ting et al. |
| 2006/0110090 A1 | 5/2006 | Ellwood, Jr. |
| 2006/0126142 A1 | 6/2006 | Choi |
| 2006/0132383 A1 | 6/2006 | Gally |
| 2006/0146575 A1 | 7/2006 | Saito |
| 2006/0164861 A1 | 7/2006 | Maeda et al. |
| 2006/0164863 A1 | 7/2006 | Chang et al. |
| 2006/0181866 A1 | 8/2006 | Jung |
| 2006/0187676 A1 | 8/2006 | Ishikura |
| 2006/0209012 A1 | 9/2006 | Hagood, IV |
| 2006/0209385 A1 | 9/2006 | Liu |
| 2006/0262562 A1 | 11/2006 | Fukasawa et al. |
| 2006/0265919 A1 | 11/2006 | Huang |
| 2006/0268574 A1 | 11/2006 | Jung |
| 2006/0285356 A1 | 12/2006 | Tseng |
| 2007/0064294 A1 | 3/2007 | Hoshino et al. |
| 2007/0081360 A1 | 4/2007 | Bailey |
| 2007/0097694 A1 | 5/2007 | Faase |
| 2007/0116424 A1 | 5/2007 | Ting |
| 2007/0133226 A1 | 6/2007 | Mi |
| 2007/0147087 A1 | 6/2007 | Parker et al. |
| 2007/0153243 A1 | 7/2007 | Mestha et al. |
| 2007/0177405 A1 | 8/2007 | Chan et al. |
| 2007/0187852 A1 | 8/2007 | Parker et al. |
| 2007/0189036 A1 | 8/2007 | Chen et al. |
| 2007/0201234 A1 | 8/2007 | Ottermann |
| 2007/0216992 A1 | 9/2007 | Tzeng et al. |
| 2007/0241340 A1 | 10/2007 | Pan |
| 2007/0268695 A1 | 11/2007 | Seetzen |
| 2007/0279727 A1 | 12/2007 | Gandhi |
| 2008/0049445 A1 | 2/2008 | Harbers |
| 2008/0089092 A1 | 4/2008 | Lee et al. |
| 2008/0090025 A1 | 4/2008 | Freking et al. |
| 2008/0094853 A1 | 4/2008 | Kim |
| 2008/0137373 A1 | 6/2008 | Li |
| 2008/0151375 A1 | 6/2008 | Lin |
| 2008/0170179 A1 | 7/2008 | Shiraishi |
| 2008/0170414 A1 | 7/2008 | Wang |
| 2008/0232135 A1 | 9/2008 | Kinder |
| 2008/0278460 A1 | 11/2008 | Arnett et al. |
| 2008/0278663 A1 | 11/2008 | Krishnan et al. |
| 2008/0285307 A1 | 11/2008 | Aylward |
| 2008/0285309 A1 | 11/2008 | Fang et al. |
| 2008/0319715 A1 | 12/2008 | Kim et al. |
| 2009/0015753 A1 | 1/2009 | Ye |
| 2009/0096956 A1 | 4/2009 | Uehara et al. |
| 2009/0126777 A1 | 5/2009 | Khazeni et al. |
| 2009/0135469 A1 | 5/2009 | Lee et al. |
| 2009/0147332 A1 | 6/2009 | Bita et al. |
| 2009/0147535 A1 | 6/2009 | Mienko |
| 2009/0168459 A1 | 7/2009 | Holman |
| 2009/0190373 A1 | 7/2009 | Bita et al. |
| 2009/0196068 A1 | 8/2009 | Wang |
| 2009/0231877 A1 | 9/2009 | Mienko |
| 2009/0251752 A1 | 10/2009 | Gruhlke et al. |
| 2009/0251783 A1 | 10/2009 | Huibers |
| 2009/0296193 A1 | 12/2009 | Bita et al. |

(56) References Cited

U.S. PATENT DOCUMENTS

| | | |
|---|---|---|
| 2009/0303746 A1 | 12/2009 | Wang |
| 2009/0309176 A1 | 12/2009 | Akram et al. |
| 2009/0320899 A1 | 12/2009 | Schiavoni et al. |
| 2009/0323144 A1 | 12/2009 | Gruhlke et al. |
| 2010/0033988 A1 | 2/2010 | Chiu |
| 2010/0039832 A1 | 2/2010 | Ahlgren et al. |
| 2010/0051089 A1 | 3/2010 | Khazeni et al. |
| 2010/0053148 A1 | 3/2010 | Khazeni et al. |
| 2010/0118563 A1 | 5/2010 | Shen et al. |
| 2010/0141557 A1 | 6/2010 | Gruhlke et al. |
| 2010/0142226 A1 | 6/2010 | Vogt et al. |
| 2010/0157406 A1 | 6/2010 | Gruhlke |
| 2010/0177533 A1 | 7/2010 | Griffiths et al. |
| 2010/0182308 A1 | 7/2010 | Holman |
| 2010/0195310 A1 | 8/2010 | Baar |
| 2010/0226118 A1 | 9/2010 | Baar |
| 2010/0231510 A1 | 9/2010 | Sampsell et al. |
| 2010/0238529 A1 | 9/2010 | Sampsell et al. |
| 2010/0302218 A1 | 12/2010 | Bita et al. |
| 2010/0302616 A1 | 12/2010 | Bita et al. |
| 2010/0302802 A1 | 12/2010 | Bita |
| 2010/0302803 A1 | 12/2010 | Bita et al. |
| 2010/0309687 A1 | 12/2010 | Sampsell et al. |
| 2011/0025727 A1 | 2/2011 | Li |
| 2011/0032214 A1 | 2/2011 | Gruhlke |
| 2011/0062604 A1 | 3/2011 | Yess et al. |
| 2011/0122479 A1 | 5/2011 | Sampsell |
| 2011/0169428 A1 | 7/2011 | Wang et al. |
| 2012/0120467 A1 | 5/2012 | Gruhlke et al. |

FOREIGN PATENT DOCUMENTS

| | | |
|---|---|---|
| CN | 1653296 A | 8/2005 |
| CN | 1755494 A | 4/2006 |
| CN | 1795403 A | 6/2006 |
| CN | 1942703 A | 4/2007 |
| CN | 101226259 | 7/2008 |
| DE | 199 42 513 | 3/2001 |
| DE | 10 2007 02509 | 12/2008 |
| EP | 0539099 A2 | 4/1993 |
| EP | 0 590 511 | 4/1994 |
| EP | 0 879 991 | 11/1998 |
| EP | 0984314 A2 | 3/2000 |
| EP | 1079264 A2 | 2/2001 |
| EP | 1 093 105 | 4/2001 |
| EP | 1 113 218 A1 | 7/2001 |
| EP | 1 127 984 | 8/2001 |
| EP | 1122586 A2 | 8/2001 |
| EP | 1 143 270 | 10/2001 |
| EP | 1 251 454 | 10/2002 |
| EP | 1 271 223 | 1/2003 |
| EP | 1 296 094 | 3/2003 |
| EP | 1 306 609 | 5/2003 |
| EP | 1 336 876 | 8/2003 |
| EP | 1 389 775 | 2/2004 |
| EP | 1413543 A1 | 4/2004 |
| EP | 1 437 610 | 7/2004 |
| EP | 1 445 629 | 8/2004 |
| EP | 1 519 218 | 3/2005 |
| EP | 1 531 302 | 5/2005 |
| EP | 1 640 764 | 3/2006 |
| EP | 1 640 961 | 3/2006 |
| EP | 1 698 918 | 9/2006 |
| EP | 1 734 401 | 12/2006 |
| EP | 1832806 A1 | 9/2007 |
| EP | 1 862 730 A1 | 12/2007 |
| EP | 1870635 A2 | 12/2007 |
| EP | 1 975 651 | 10/2008 |
| GB | 2 260 203 | 4/1993 |
| GB | 2 315 356 | 1/1998 |
| GB | 2351834 A | 1/2001 |
| JP | 60 242408 | 12/1985 |
| JP | 09 160032 | 6/1997 |
| JP | 9171111 A | 6/1997 |
| JP | 09 311333 | 12/1997 |
| JP | 11 167808 | 6/1999 |
| JP | 11 211999 | 8/1999 |
| JP | 11231321 A | 8/1999 |
| JP | 11326898 A | 11/1999 |
| JP | 2000075293 A | 3/2000 |
| JP | 2000081848 | 3/2000 |
| JP | 2000181367 | 6/2000 |
| JP | 2000193933 A | 7/2000 |
| JP | 2000314882 A | 11/2000 |
| JP | 2001021883 | 1/2001 |
| JP | 2001-283622 | 10/2001 |
| JP | 2002072284 A | 3/2002 |
| JP | 2002-098838 | 4/2002 |
| JP | 2002108227 | 4/2002 |
| JP | 2002174732 A | 6/2002 |
| JP | 2002174780 | 6/2002 |
| JP | 2002 196151 | 7/2002 |
| JP | 2002245835 A | 8/2002 |
| JP | 2002-365438 | 12/2002 |
| JP | 2003 007114 | 1/2003 |
| JP | 2003057653 A | 2/2003 |
| JP | 2003 173713 | 6/2003 |
| JP | 2003 188959 | 7/2003 |
| JP | 2003186008 A | 7/2003 |
| JP | 2003315694 A | 11/2003 |
| JP | 2003338213 A | 11/2003 |
| JP | 2003344881 | 12/2003 |
| JP | 2004-227934 | 8/2004 |
| JP | 2005209558 A | 8/2005 |
| JP | 2005-259365 | 9/2005 |
| JP | 2006 099105 | 4/2006 |
| JP | 2006107993 | 4/2006 |
| JP | 2006113559 A | 4/2006 |
| JP | 2008084544 A | 4/2008 |
| JP | 2008103110 A | 5/2008 |
| JP | 2009300966 A | 12/2009 |
| TW | 567388 B | 12/2003 |
| WO | WO 95/01584 | 1/1995 |
| WO | WO 96/16348 | 5/1996 |
| WO | WO 98/19201 | 5/1998 |
| WO | 9964785 A1 | 12/1999 |
| WO | WO 99/63394 | 12/1999 |
| WO | WO 00/50807 | 8/2000 |
| WO | WO 01/29148 | 4/2001 |
| WO | 0184228 A1 | 11/2001 |
| WO | WO 01/84229 | 11/2001 |
| WO | WO 02/35145 A1 | 5/2002 |
| WO | WO 02/097324 | 12/2002 |
| WO | WO 03/007049 A1 | 1/2003 |
| WO | WO 03/056876 | 7/2003 |
| WO | WO 2004/088372 | 10/2004 |
| WO | 2004114418 A1 | 12/2004 |
| WO | WO 2005/011012 | 2/2005 |
| WO | WO 2005/076051 A1 | 8/2005 |
| WO | WO 2005/088367 | 9/2005 |
| WO | WO 2006/008702 | 1/2006 |
| WO | WO 2006/036451 | 4/2006 |
| WO | WO 2007/064133 | 6/2007 |
| WO | WO 2007/088886 | 8/2007 |
| WO | WO 2008/045218 | 4/2008 |
| WO | WO 2008/045311 | 4/2008 |
| WO | WO 2008/099989 A1 | 8/2008 |
| WO | WO 2008/145096 | 12/2008 |
| WO | WO 2009/102672 | 8/2009 |

OTHER PUBLICATIONS

Fan et al. "Channel Drop Filters in Photonic Crystals", Optics Express, vol. 3, No. 1, pp. 4-11, 1998.

Giles et al. "Silicon MEMS Optical Switch Attenuator and Its Use in Lightwave Subsystems", IEEE Journal of Selected Topics in Quantum Electronics, vol. 5. No. 1, pp. 18-25, Jan./Feb. 1999.

Little et al. "Vertically Coupled Microring Rosonator Channel Dropping Filter", IEEE Photonics Technology Letters, vol. 11, No. 2, pp. 215-217, 1999.

Magel, "Integrated Optic Devices Using Micromachined Metal Membranes", SPIE vol. 2686, 0-8194-2060-3, pp. 54-63, 1996.

(56) References Cited

OTHER PUBLICATIONS

Mehregany et al., "MEMS applications in Optical Systems," IEEE/LEOS 1996 Summer Topical Meetings, pp. 75-76, Aug. 1996.
Neal T.D. et al. "Surface Plasmon enhanced emission from dye doped polymer layers," Optics Express Opt. Soc. America, USA, vol. 13, No. 14, pp. 5522-5527, Jul. 11, 2005.
Oliner, "Radiating Elements and Mutual Coupling," Microwave Scanning Antennas, vol. 2, pp. 131-157 and pp. 190-194, 1966.
OSRAM Opto Semiconductors, "Multi Micro SIDELED," Preliminary Data, Dec. 11, 2008.
Zhou et al. "Waveguide Panel Display Using Electromechanical Spatial Modulators" SID Digest, vol. XXIX, 1998.
International Preliminary Report on Patentability in PCT/US2009/033597 (Publication No. WO 2009/102672) dated Aug. 26, 2010.
Partial International Search Report dated May 19, 2009 in PCT Application No. PCT/US2009/033597.
Yan et al. "Edge-Lighting Light Guide Plate Based on Micro-Prism for Liquid Crystal Display," Journal of Display Technology, vol. 5, No. 9, pp. 355-357, Sep. 2009.
Yu et al. "Design Optimization and Stamper Fabrication of Light Guiding Plates Using Silicon Based Micro-Features," IEEE Symposium on DTIP of MEMS/MOEMS, Rome, Apr. 1-3, 2009.

|  | Column Output Signals | |
|---|---|---|
|  | $+V_{bias}$ | $-V_{bias}$ |
| Row Output Signals   0 | Stable | Stable |
| $+\Delta V$ | Relax | Actuate |
| $-\Delta V$ | Actuate | Relax |

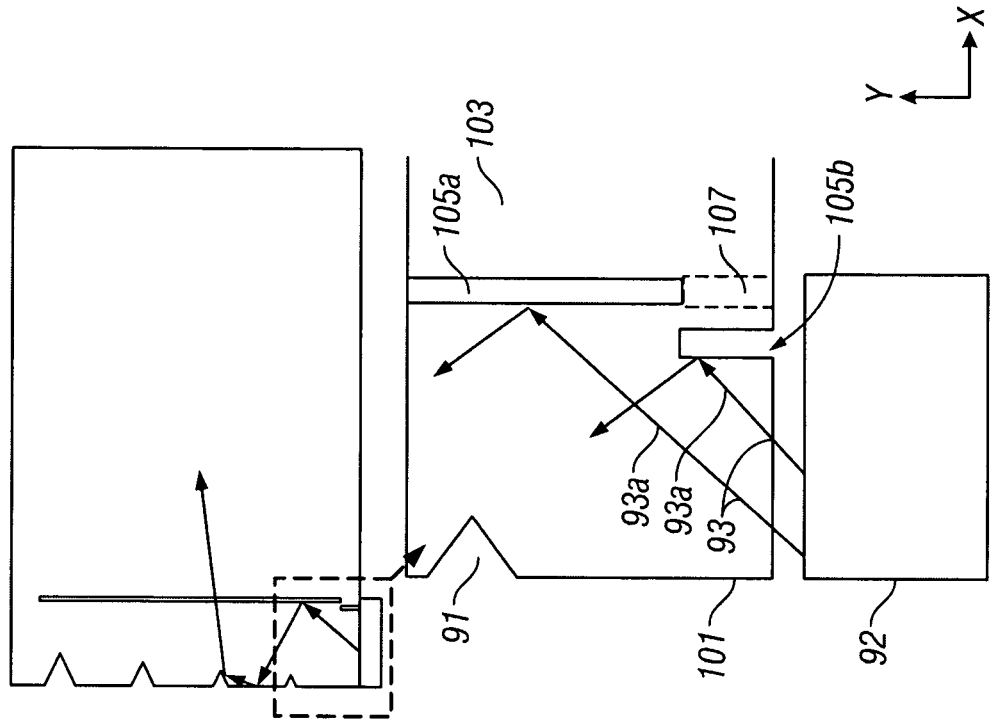
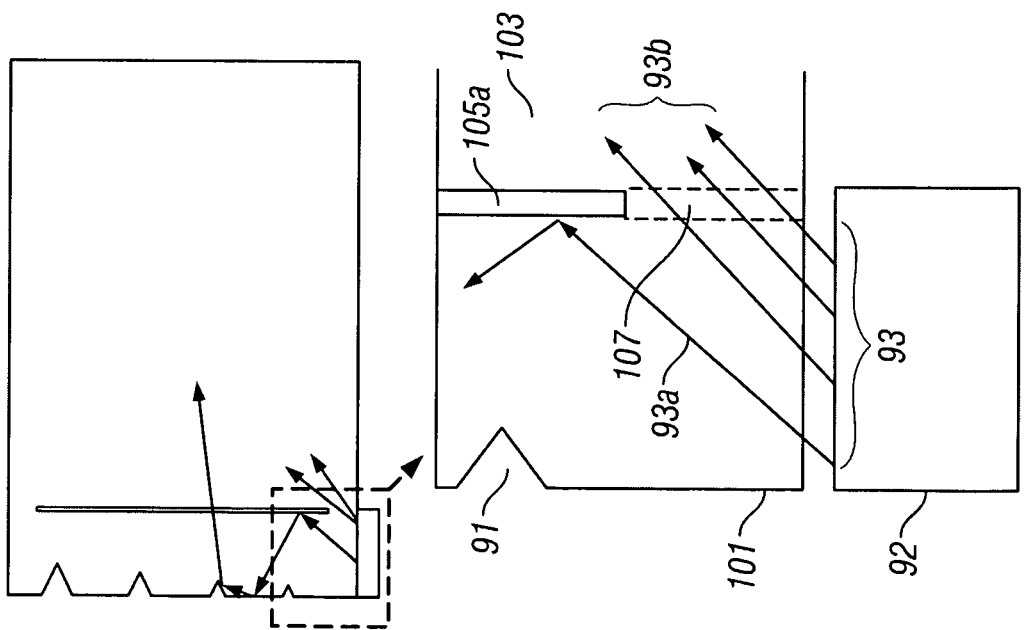
FIG. 11A
FIG. 11B

INTEGRATED FRONT LIGHT SOLUTION

CROSS-REFERENCE TO RELATED APPLICATIONS

This application claims priority from U.S. Provisional Patent Application No. 61/028,127, filed on Feb. 12, 2008, which is incorporated herein by reference.

BACKGROUND

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

One embodiment of the invention comprises an integrated illumination apparatus comprising: a light injection portion having a first end for receiving light from a light source, said light injection portion comprising material that supports propagation of said light along the length of the light injection portion towards a second opposite end; turning microstructure disposed on a first side of the light injection portion, the turning microstructure configured to turn at least a substantial portion of light incident on the first side and to direct the portion of the light towards a second opposite side of the light injection portion; a slit disposed along the length of the light injection portion, the slit forming an optical interface on the second opposite side of the light injection portion that provides total internal reflection for light propagating along the length of the light injection portion to be guided therein, said optical interface further transmitting light turned by said turning microstructure; a light distribution portion disposed with respect to the slit to receive the light turned by said turning microstructure and transmitted out of the second side of the light injection portion and through said slit; and at least one bridge disposed between light injection portion and the light distribution portion and mechanically connecting the light injection portion to the light distribution portion. Other embodiments are possible.

BRIEF DESCRIPTION OF THE DRAWINGS

FIG. 11A is a top view of a corner region of an integrated illumination system having one long slit and a pair of bridges illustrating light leakage through one of the bridges.

FIG. 11B is a top view of a corner region of an integrated illumination system having a wide slit and an additional narrow slit for reducing or eliminating light leakage through a bridge according to certain embodiments.

DETAILED DESCRIPTION OF THE PREFERRED EMBODIMENTS

The following detailed description is directed to certain specific embodiments. However, the teachings herein can be applied in a multitude of different ways. In this description, reference is made to the drawings wherein like parts are designated with like numerals throughout. The embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Some embodiments include an integrated illumination apparatus comprising a light injection portion for receiving light from a light source along its length direction and propagating the light along its length direction, and a light distribution portion for receiving the light turned and transmitted from the light injection portion. The light injection portion and the light distribution portion are mechanically connected across one or more slits or openings via one or more bridges, thereby forming an integrated light injection/light distribution structure.

Figure 1:
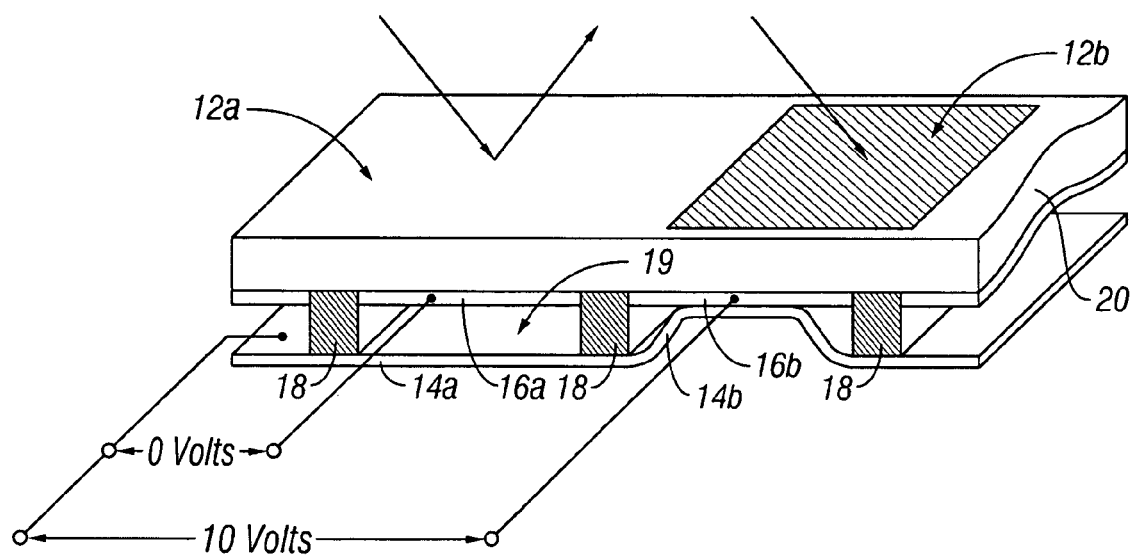
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("relaxed" or "open") state, the display element reflects a large portion of incident visible light to a user. When in the dark ("actuated" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) to form columns deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device. Note that FIG. 1 may not be to scale. In some embodiments, the spacing between posts 18 may be on the order of 10-100 um, while the gap 19 may be on the order of <1000 Angstroms.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential (voltage) difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by actuated pixel 12b on the right in FIG. 1. The behavior is the same regardless of the polarity of the applied potential difference.

FIGS. 2 through 5 illustrate one exemplary process and system for using an array of interferometric modulators in a display application.

Figure 2:
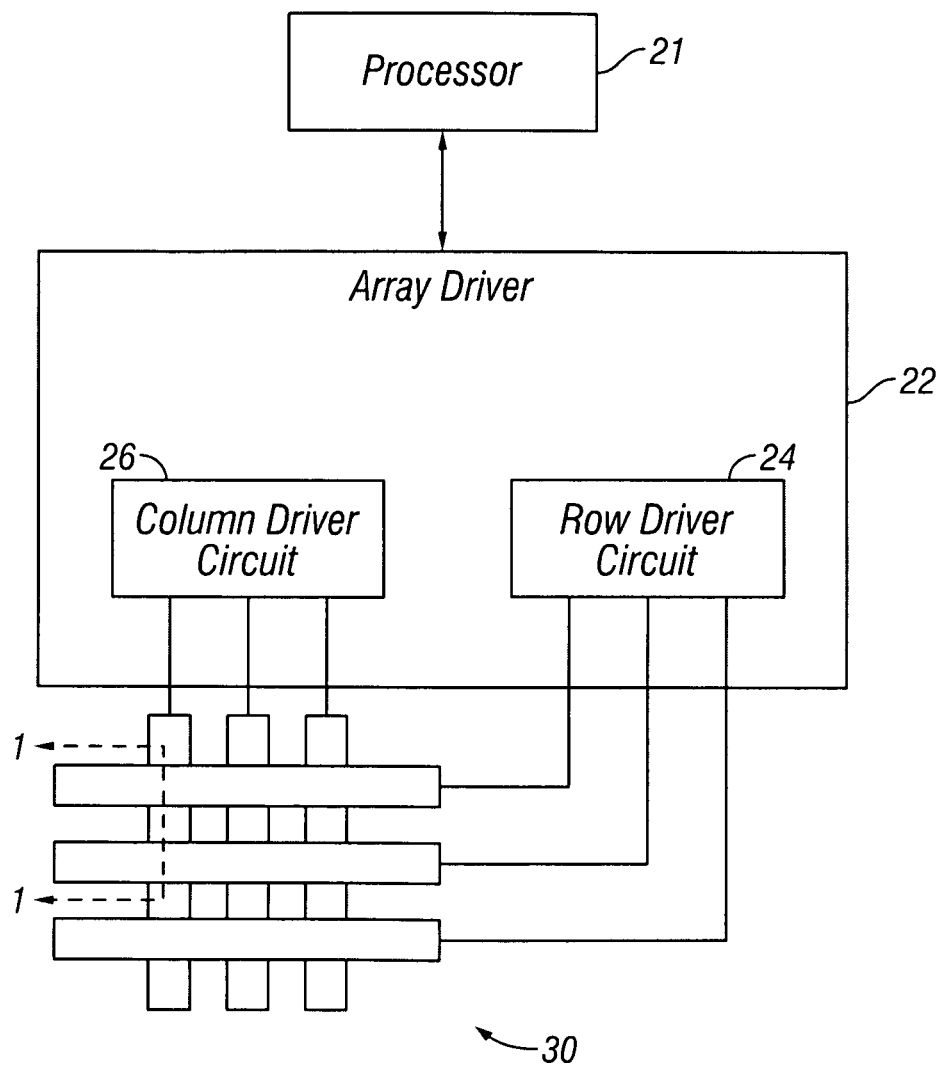
FIG. 2 is a system block diagram illustrating one embodiment of an electronic device incorporating a 3×3 interferometric modulator display.

FIG. 2 is a system block diagram illustrating one embodiment of an electronic device that may incorporate interferometric modulators. The electronic device includes a processor 21 which may be any general purpose single- or multi-chip microprocessor such as an ARM®, Pentium®, 8051, MIPS®, Power PC®, or ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. Note that although FIG. 2 illustrates a 3×3 array of interferometric modulators for the sake of clarity, the display array 30 may contain a very large number of interferometric modulators, and may have a different number of interferometric modulators in rows than in columns (e.g., 300 pixels per row by 190 pixels per column).

Figures 3, 4:
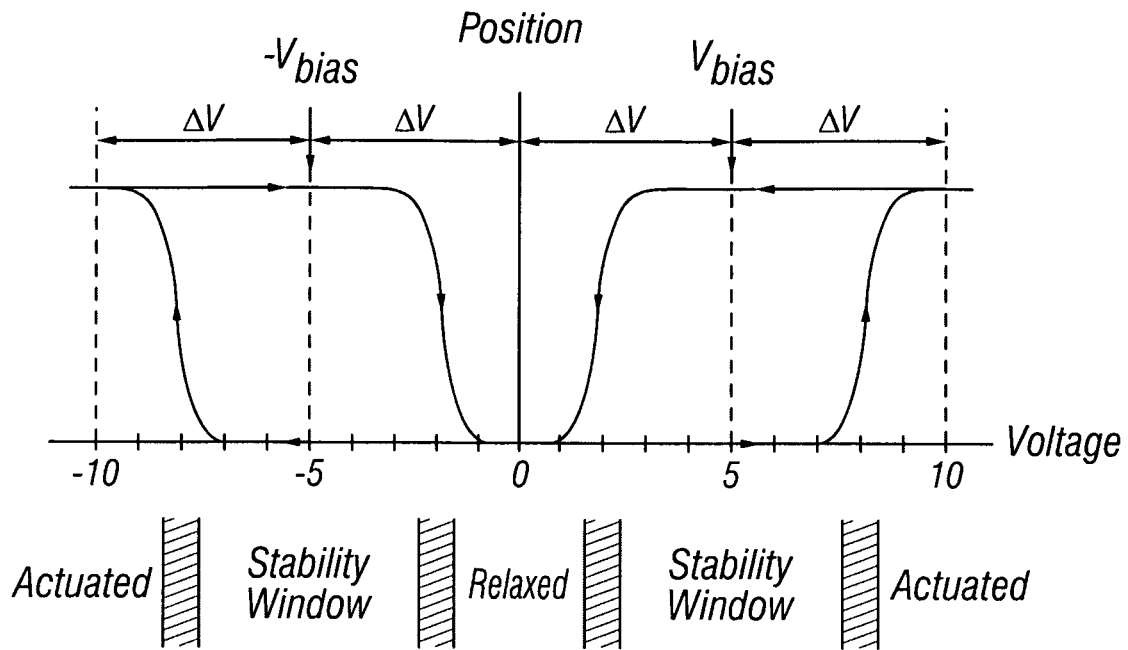
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIG. 3 is a diagram of movable mirror position versus applied voltage for one exemplary embodiment of an interferometric modulator of FIG. 1. For MEMS interferometric modulators, the row/column actuation protocol may take advantage of a hysteresis property of these devices as illustrated in FIG. 3. An interferometric modulator may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state or bias voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

As described further below, in typical applications, a frame of an image may be created by sending a set of data signals (each having a certain voltage level) across the set of column electrodes in accordance with the desired set of actuated pixels in the first row. A row pulse is then applied to a first row electrode, actuating the pixels corresponding to the set of data signals. The set of data signals is then changed to correspond to the desired set of actuated pixels in a second row. A pulse is then applied to the second row electrode, actuating the appropriate pixels in the second row in accordance with the data signals. The first row of pixels are unaffected by the second row pulse, and remain in the state they were set to during the first row pulse. This may be repeated for the entire series of rows in a sequential fashion to produce the frame. Generally, the frames are refreshed and/or updated with new image data by continually repeating this process at some desired number of frames per second. A wide variety of protocols for driving row and column electrodes of pixel arrays to produce image frames may be used.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
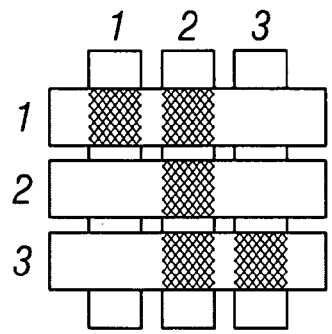
FIG. 5A illustrates one exemplary frame of display data in the 3×3 interferometric modulator display of FIG. 2.
Figure 5B:
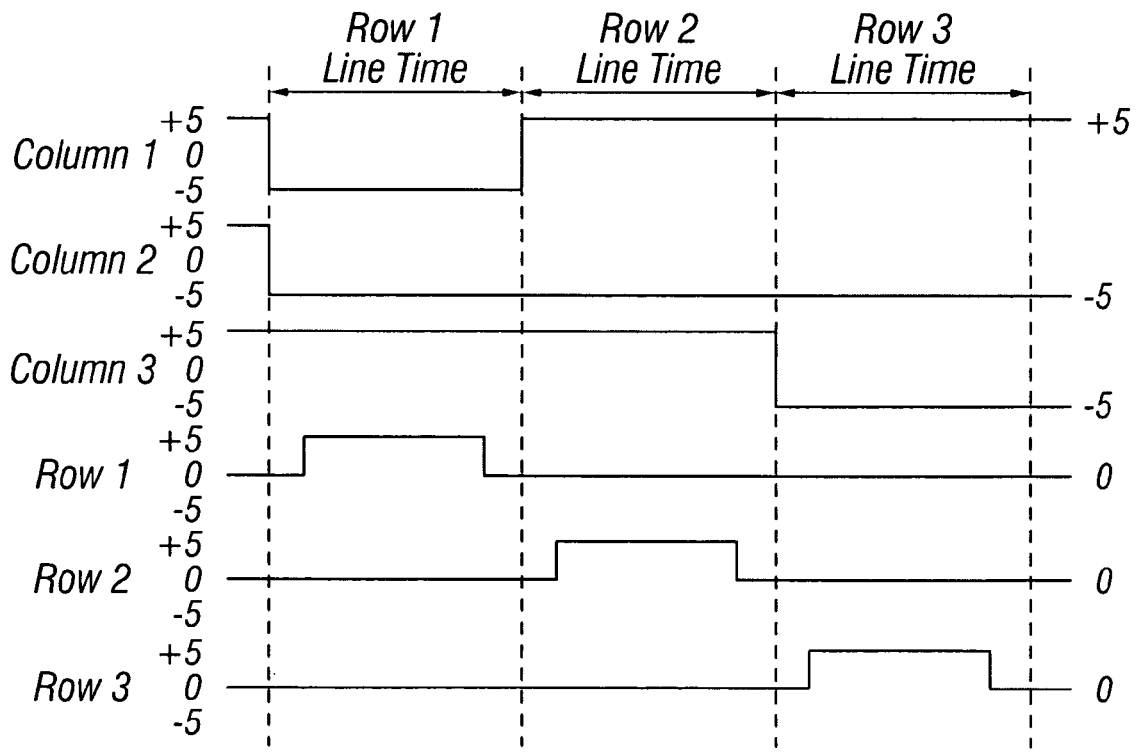
FIG. 5B illustrates one exemplary timing diagram for row and column signals that may be used to write the frame of FIG. 5A.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are initially at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. The same procedure can be employed for arrays of dozens or hundreds of rows and columns. The timing, sequence, and levels of voltages used to perform row and column actuation can be varied widely within the general principles outlined above, and the above example is exemplary only, and any actuation voltage method can be used with the systems and methods described herein.

Figure 6A:
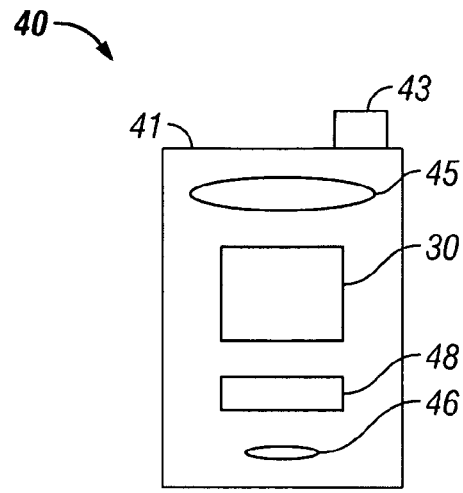
FIGS. 6A and 6B are system block diagrams illustrating an embodiment of a visual display device comprising a plurality of interferometric modulators.
Figure 6B:
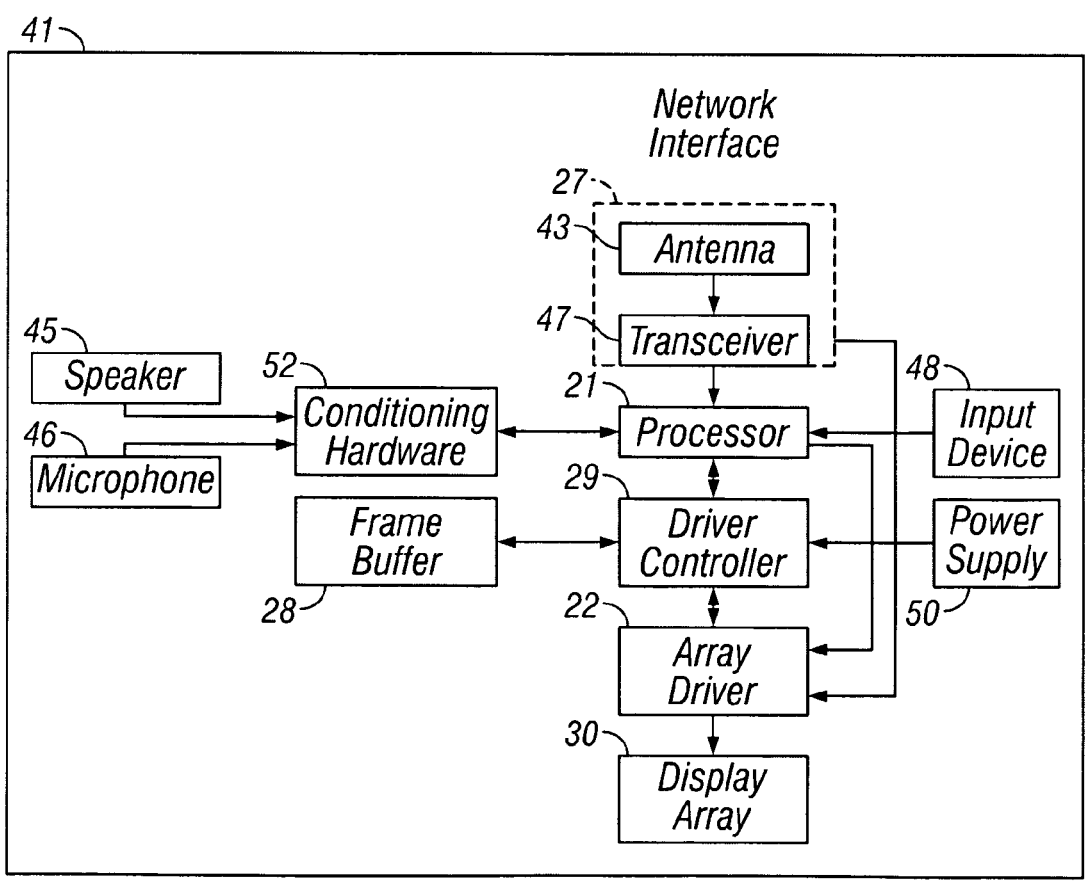

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, W-CDMA, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. The above-described optimization may be implemented in any number of hardware and/or software components and in various configurations.

Figure 7A:
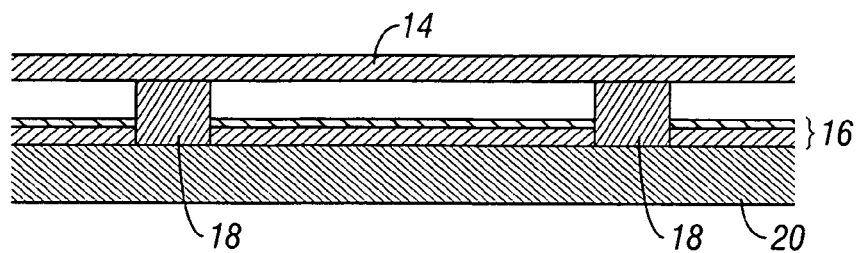
FIG. 7A is a cross section of the device of FIG. 1.
Figure 7B:
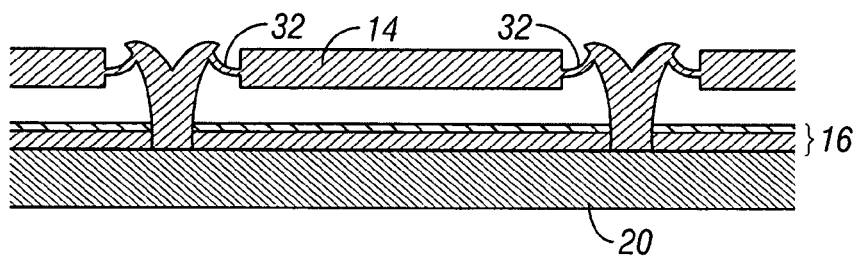
FIG. 7B is a cross section of an alternative embodiment of an interferometric modulator.
Figure 7C:
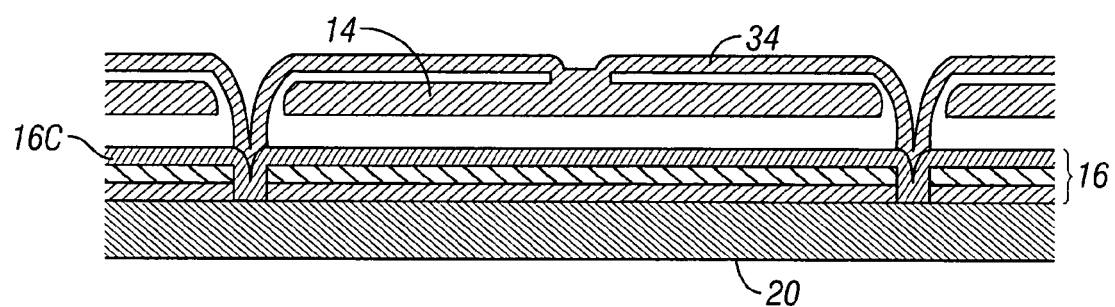
FIG. 7C is a cross section of another alternative embodiment of an interferometric modulator.
Figure 7D:
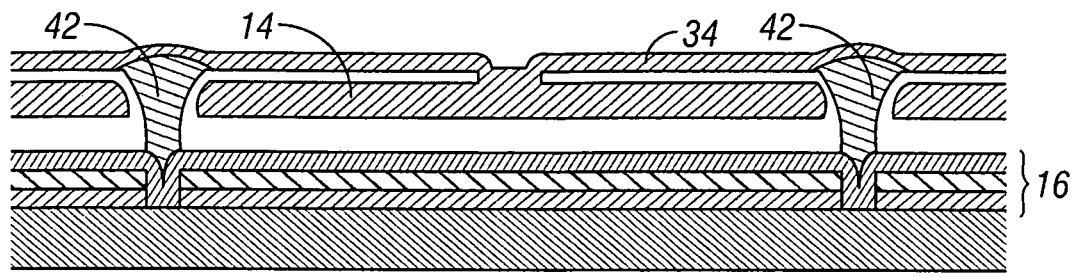
FIG. 7D is a cross section of yet another alternative embodiment of an interferometric modulator.
Figure 7E:
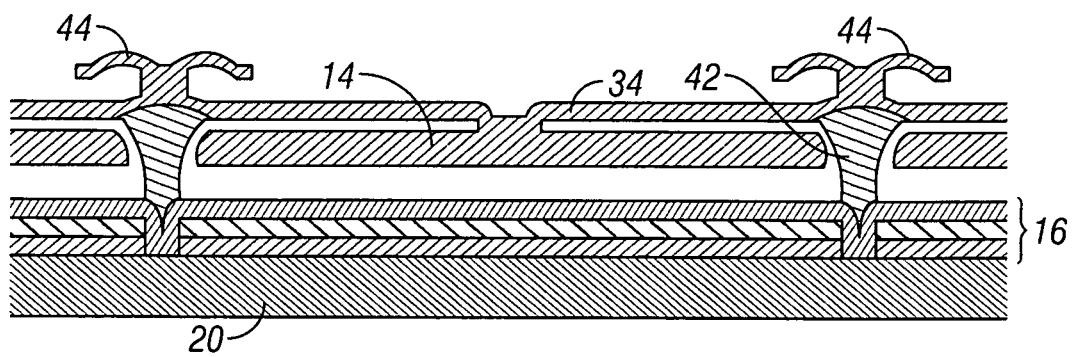
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 of each interferometric modulator is square or rectangular in shape and attached to supports at the corners only, on tethers 32. In FIG. 7C, the moveable reflective layer 14 is square or rectangular in shape and suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. For example, such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Integrated illumination systems for providing artificial illumination for underlying modulators are disclosed herein. The integrated illumination system comprises a light source, a light injection portion, and a light distribution portion. The light injection portion transforms light from a point source (e.g., a light emitting diode (LED)) into a line source. A light injection portion having turning features may be used for this purpose. Light injected into the light injection portion propagates along the length of the bar portion and is ejected out of the bar over the length of the bar. This light is subsequently spread across a wide area and directed onto an array of display elements. A light distribution portion also having turning features thereon may be used for this purpose. The light ejected from the light injection portion is coupled into an edge of the light distribution portion and propagated within the light distribution portion. Turning features eject the light from the panel portion over an area corresponding to the plurality of display elements.

Figure 8A:
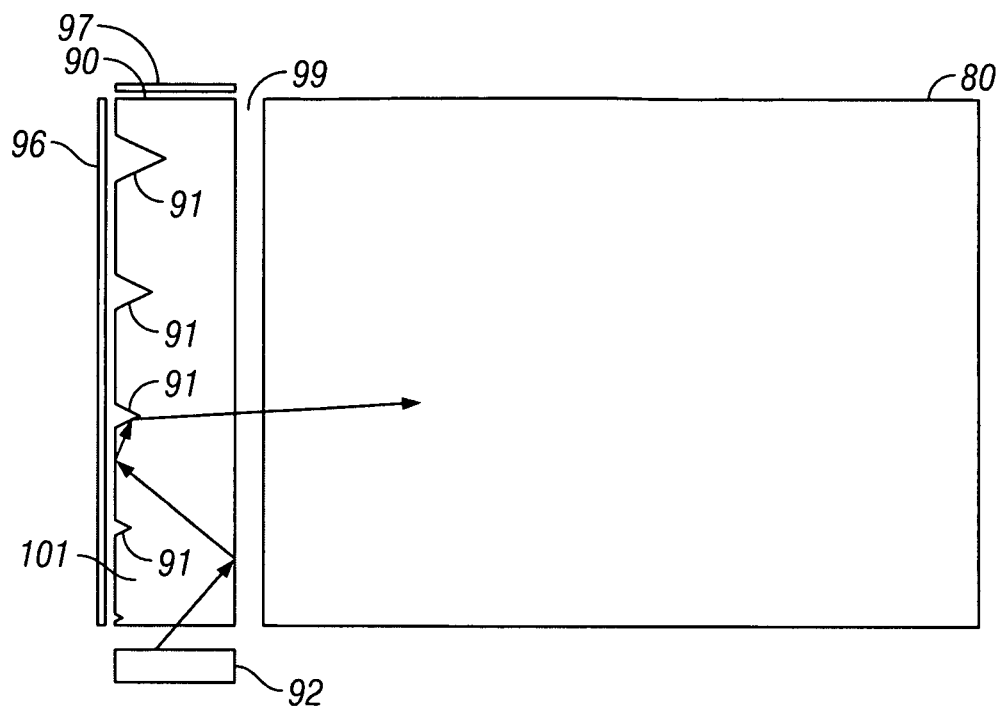
FIG. 8A is a top view of a nonintegrated illumination system comprising separate light injection and light distribution components.

FIG. 8A is a top view of a nonintegrated illumination system comprising separate light injection and light distribution components. The illumination system includes a light injection component 101, a light distribution component 80, a light source 92, and a plurality of reflectors 96, 97. The light injection component 101 includes turning microstructure comprising a plurality of turning features 91. The illumination system may further include one or more reflectors 96, 97 that receive and reflect light transmitted through the sides of the light injection component 101. In the illumination system, the light injection component 101 and the light distribution component 80 are separate structures. For maximum efficiency, the light injection component 101 and the light distribution component 80 are accurately aligned with respect to each other.

Figure 8B:
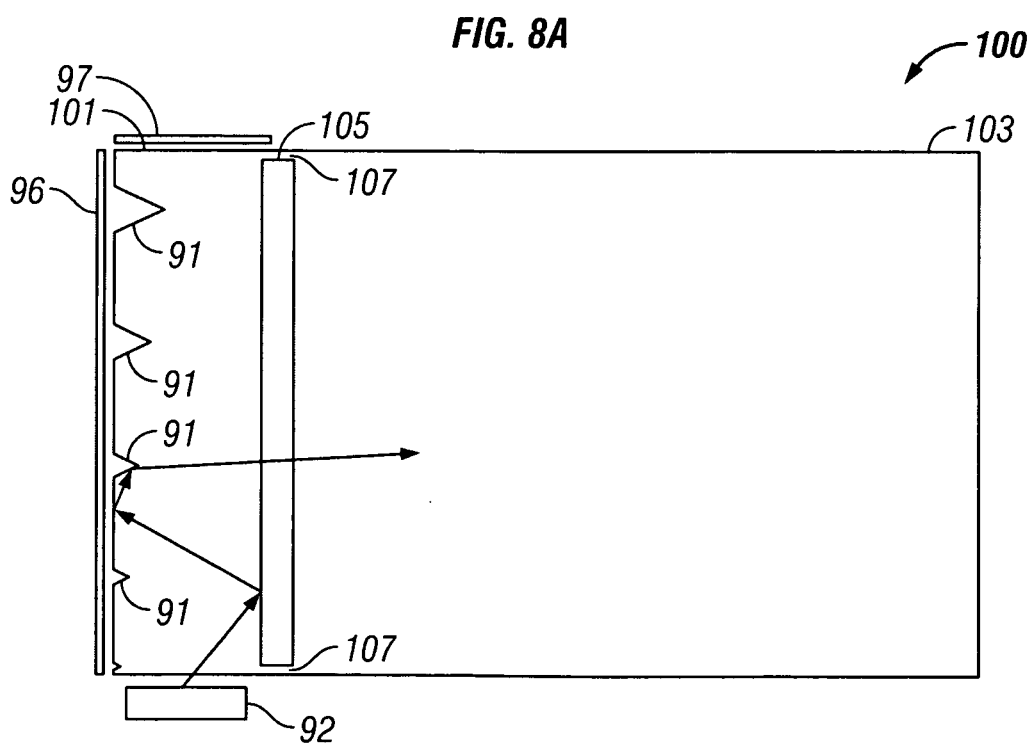
FIG. 8B is a top view of an integrated illumination system comprising light injection and light distribution portions connected by bridges according to certain embodiments.

FIG. 8B is a top view of an example of an integrated illumination system 100 comprising light injection and light distribution portions connected by bridges according to certain embodiments. The integrated illumination system 100 comprises a light injection portion 101, a light distribution portion 103, a slit 105, and bridges 107. The light injection portion 101 includes turning microstructure comprising a plurality of turning features 91. In certain embodiments, the light injection portion 101 includes a light bar having a rectangular cross section such as the one shown in FIG. 8B. In the example embodiment, the turning features 91 include V or triangular-shaped grooves in the side of the light injection portion. In the example integrated illumination system, the bridges 107 provide a mechanical connection between the light injection portion 101 and the light distribution portion 103. The slit 105 is a narrow open area surrounded on opposite sides by the light injection portion 101, the light distribution portion 103, and the bridges.

In certain embodiments of the integrated illumination system, the light injection portion, the light distribution portion, and the bridges comprise a monolithic structure such as a unitary film. In such embodiment, the light injection portion and the light distribution portion are contained in a single film. The illumination system may also further include one or more reflectors 96, 97 that receive and reflect light transmitted through the sides of the light injection portion.

Various advantages are realized by use of an unitary integrated structure such as a monolithic film. The monolithic design eliminates the manufacture and inventory of separate light-bar and light-guide components. More importantly, the unitary design eliminates the precise alignment between the light-bar and light-guide components. In a non-monolithic illumination structure involving separate light injection component 90 and light distribution component 80, such as the one shown in FIG. 8A, the light injection and the light distribution component are free to move relative to each other. For maximum efficiency, the light injection and the light distribution components are precisely positioned relative to each other. For example, the light injection component 90 and the light distribution component 80 are positioned precisely in the x-direction in order to create a slit having an optimal width. The light injection component 90 and the light distribution component 80 are also aligned precisely in the y and z directions to increase or maximize light coupling from the light injection component to the light distribution component through the slit 99. In addition, for increased or maximum coupling, the thicknesses of the light injection component and the light distribution component are also precisely matched. The precise alignment/positioning and the thickness control can incur extra manufacturing costs and become extra source of product defects. In a monolithic film design such as the one shown in FIG. 8B, these problems are sufficiently avoided. The positioning/alignment and the thicknesses of the light injection and light distribution portions are precisely matched without the need of any complicated assembly process. In some monolithic film embodiments, the turning microstructures 91 on the light injection portion can be formed directly into an edge of the monolithic film in the same fabricating process as for the light distribution portion and the light injection portion simplifying fabrication. Formation of the turning microstructures on the edge of the monolithic film is easier compared to formation of the microstructures on an edge of a smaller, and therefore, harder to handle, separate light injection component. This is especially true if the microstructures are formed in the monolithic film before the slit 105 is made. Turning features on the light distribution portion 103 may also be formed at the same time as the slit in some embodiments and may thus simplify fabrication.

Figure 9A:
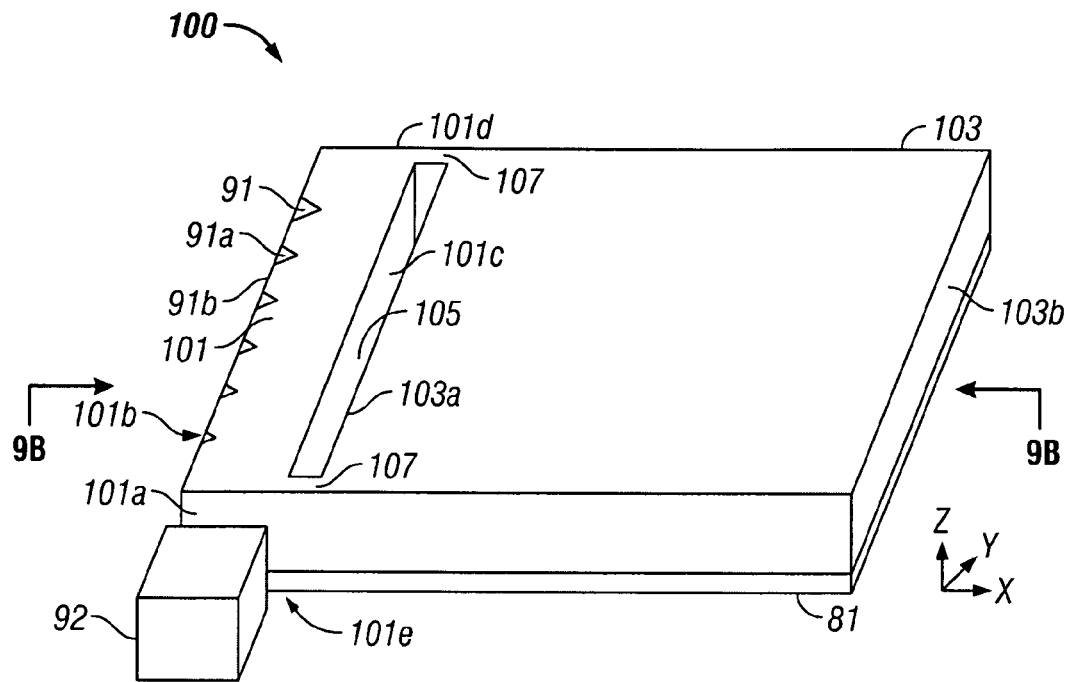
FIG. 9A is a perspective view of a display device including an integrated illumination system comprising a light distribution portion disposed with respect to a plurality of display elements.

FIG. 9A is a perspective view of a display device including an integrated illumination system 100 comprising a light distribution portion 103 disposed with respect to a display substrate comprising a plurality of display elements 81. The integrated illumination system 100 includes a light injection portion 101, a light distribution portion 103, a slit 105, and bridges 107. The light injection portion 101 has a first end 101a for receiving light from a light emitter 92, a second opposite edge 101d, a first side 101b, and a second opposite side 101c. The light emitter 92 may comprise a light emitting diode (LED), although other light sources are also possible. The light injection portion 101 comprises substantially optically transmissive material that supports propagation of light from the emitter along the length of the light injection portion 101. The light distribution portion 103 includes a first side 103a and a second opposite side 103b.

As discussed above, in certain embodiments of the integrated illumination system, the light injection portion, the light distribution portion, and the bridges comprise a monolithic structure such as a unitary film. Such unitary film can be laminated to a display substrate including a plurality of display elements 81. The display elements 81 may be on the other side of the display substrate as the integrated illumination system. In the area directly beneath the light injection portion 101 of the film, a refractive index mismatch may be generated between the film and the display substrate in order to aid total internal reflection (TIR) with the film having the larger of the two indices. Alternatively, this portion of the film may not contain any adhesive and light guiding, e.g., TIR, relies on the presence of a small air gap. Such small gap typically exits when one material is resting on top of another.

In operation, the light emitted from the light emitter 92 propagates into the light injection portion 101. The light is guided therein, for example, via total internal reflection at sides 101b and 101c thereof, which form optical interfaces with air or some other surrounding medium. In various embodiments, this surrounding medium may comprise air or gas. This surrounding medium may alternatively comprise solid or liquid. Accordingly, this medium may be fluid. Light travels from the first end 101a to a second end 101d of the light injection portion 101. A substantial portion of the light traveling along the light injection portion gets turned by the turning microstructure towards the second opposite side 101c of the light injection portion 101 at an angle less than a critical angle. The slit 105 is disposed along the length of the light injection portion and forms an optical interface on the second opposite side 101c of the light injection portion 101 that provides total internal reflection for light propagating along the length of the light injection portion to be guided therein. The optical interface further transmits at least some of the light turned by the turning microstructure and incident on the interface at an angle greater than the critical angle. The light distribution portion 103 is disposed with respect to the light injection portion 101 so as to receive through the first side 103a the light injected from the light injection portion 101, e.g., the light that has been turned by the turning microstructure and directed out of the light injection portion 101 and through the slit 105. The light distribution portion 103 is configured to receive the light injected from the light injection portion 101 and distribute the received light onto a plurality of display elements 81. In certain embodiments, the light distribution portion 103 includes turning microstructures 109 (FIG. 9B) that reflect light from the light injection portion 101 into the plurality of display elements 81 (e.g., a plurality of spatial light modulators, interferometric modulators, liquid crystal elements, etc.) as described above.

The turning microstructure of the light injection portion 101 comprises a plurality of turning features 91 having facets 91a (which may be referred to as faceted turning features or faceted features), as can be seen in FIG. 9A. The features 91 shown in FIG. 9A are schematic and exaggerated in size and spacing therebetween. As illustrated, the turning microstructure is integrated with the light injection portion 101. For example, the light injection portion 101 may be molded with the turning features 91 formed therein by molding. Alternatively, the turning microstructures may be formed by cutting the light injection portion or by other methods. In certain embodiments, some or all of the faceted features 91 of the turning microstructure could be formed in a film that is formed on, or laminated to, the light injection portion 101.

The facets 91a or sloping surfaces are configured to direct or scatter light out of the light injection portion 101 towards the light distribution portion 103. Light may, for example, reflect by total internal reflection from a portion 91b of the sidewall of the light injection portion 101 parallel to the length of the light injection portion 101 to one of the sloping surfaces 91a. This light may reflect from the sloping surface 91a in a direction toward the light distribution portion 103. (See also FIG. 10B) In the embodiment illustrated in FIG. 9B, the turning microstructure comprises a plurality of grooves.

Specifically, the turning microstructure comprises a plurality of triangular grooves having substantially triangular cross-sections. The triangular grooves illustrated in FIG. 9B have cross-sections with the shape of an isosceles triangle, although other shapes are also possible. The orientation of the sides 91a can affect the distribution of light exiting the light injection portion 101 and entering the light distribution portion 103. Other shapes may be used.

In some embodiments, the turning microstructure has a parameter that changes with distance, d, from the first end 101a of the light injection portion 101 and/or the light source 92. In some embodiments, the parameter of the microstructure that changes with distance, d, from the first end 101a of the light injection portion 101 and/or the light source 92 is size, shape, density, spacing, position, etc. In certain such embodiments, the turning microstructure has a size that, on average, increases with distance, d, from the light source 92. For example, the turning microstructure in some embodiments has a width (e.g., parallel to y-axis) that, on average, increases with distance, d, from the light source 92. In another example, the turning microstructure in some embodiments has a depth (e.g., parallel to the x axis) that, on average, increases with distance, d, from the light source 92. The turning features 91 illustrated in FIG. 9A increase in both depth and width, while the angles of the facets 91a or sloping sidewalls remain substantially constant. In some embodiments, one or more other parameters of the turning microstructure may change, such as shape and angle.

In certain embodiments, the turning microstructure has a density, $\rho$, of turning features 91 that remains substantially the same with distance, d, from the light source. For example, in FIG. 9B the plurality of triangular grooves 91 are approximately equally spaced from each other. In certain other embodiments, the turning microstructure has a density, $\rho$, that increases with distance, d, from the first end 101a of the light injection portion 101 and/or the light source 92. For example, the turning microstructure in some embodiments has a spacing (e.g., along the y-axis) that, on average, increases with distance, d, from the first end 101a of the light injection portion 101 and/or the light source 92.

In some embodiments, the light injection portion 101 has a turning efficiency that determines the amount of light turned out of the light injection portion 101 compared to the amount of light that continues to be guided within the light injection portion 101. For example, the turning efficiency can increase with an increasing density of turning microstructures. In certain such embodiments, the microstructure density and, therefore, the turning efficiency increase with distance, d, from the first end 101a of the light injection portion 101 and/or the light source 92.

Figure 9B:
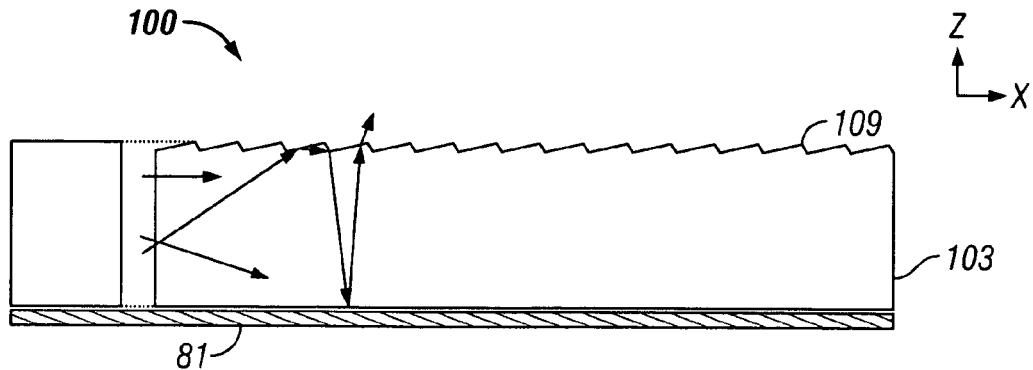
FIG. 9B is a side cross-sectional view of a display device including an integrated illumination system comprising a light distribution portion disposed with respect to a plurality of display elements.

In certain embodiments, the slit 105 runs nearly across the entire length of the integrated illumination system (e.g., along y direction), thereby forming relatively narrow bridges 107 as shown in FIG. 9B. In some embodiments, the length of the slit is between 90 percent and 100 percent of the length of the light injection portion 101 (e.g., in y direction). In some embodiments, the width of the slit (e.g., in x direction) is less than 5% of the length of the slit (e.g., in y direction). The width of the slit can be between 1 µm and 10 mm, and preferably between 50 µm and 200 µm. The width of the slit is related to coupling efficiency. In general, smaller the slit width is, the higher the coupling efficiency is. In some embodiments, the width of the slit is determined by the ease of cutting the slit and the need to reduce overall width (e.g., x dimension) of the integrated illumination system. The slit can be manufactured by a variety of methods, including die-cutting, molding, embossing, and the like.

In certain embodiments, the slit is not placed too close to the first side 101b. As the distance between the slit and the faceted first side 101b of the light injection portion decreases, light into the x-y plane more frequently strikes the facets. This fact is taken into account in the facet and slit designs. Also, the width (x-direction) of the light injection portion 101 needs to be large enough to capture light from the light source 92. In certain embodiments, the second opposite side 101c of the light injection portion 101 forming a first side wall of the slit 105 is positioned substantially aligned with one side of the light source 92 as shown in FIG. 9A. In certain other embodiments, the first side 103a of the light distribution portion 103 forming a second side wall of the slit is positioned substantially aligned with one edge of the module forming the display elements 81 as shown in FIG. 9A. In certain embodiments, the slit is symmetrically positioned in the length (e.g., y) direction such that the widths of the bridges are substantially the same as shown in FIG. 9A. In other embodiments, it may be advantageous to asymmetrically position the slit so as to provide a wider bridge at the edge opposite to the light source. This design allows more light to enter the typically dim region of the light distribution portion close to the opposite edge.

In certain embodiments, the slit may comprise an opening filled with air, gases, or liquid, e.g. adhesive flowed into at least part of the slit. In various such embodiments, however, the light injection portion 101 and the slit 105 form a high-index to low-index interface. In some embodiments, the high-index to low-index interface comprises a plastic/air interface. The shape of the slit is shown as rectangular but may differ. The slit may include flat parallel sides such as shown. In certain other embodiments, the slit may include one or more performance-enhancing features formed on the sides to control the direction of transmitted light, for example. Such performance-enhancing features formed on side walls of a slit are described in detail below with reference to FIG. 12A to FIG. 12D.

In certain embodiments, the bridges 107 are narrow portions remaining after the slit is formed nearly across the entire length of the integrated illumination system as shown in FIG. 9A. In some of such embodiments, the width (y-direction) of the bridge is less than 5% of the length of the light injection portion 101. The width of the bridge is preferably between 1% and 50% of the length of the light injection portion 101. The width of the bridge is preferably between 1 mm and 20 mm. The number of bridges is preferably 2 but can range from 1 to 10. In some embodiments, the length of the slit extends (e.g., in y-direction) slightly (e.g., less than 5 mm) beyond the size of the active area of the display and the first side 103a of the light distribution portion 103 is disposed (e.g., in x-direction) slightly (e.g., less than 5 mm) outside the active area of the display, such that the bridges thereby formed are placed outside the active area of the display. As used herein, the "active area" refers to the part of the display substrate containing the display elements 81. Various methods of manufacturing the slit, therefore also of bridges, are described above. In some embodiments, the bridges 107 are disposed proximal to the first end 101a and the second opposite end 101d of the light injection portion 101. In some embodiments, one or more bridges are disposed proximal to the center between the first end 101a and the second opposite end 101d of the light injection portion 101. In certain embodiments, one or more bridges may have a thickness that is different from the thickness of the light injection portion 101 and/or the light distribution portion 103. For example, the thickness of the bridge may be only 50% of the thickness of the light injection and the light distribution portions. In certain embodiments, the bridge may comprise the same material as the light injection portion and the light distribution portion. In some embodiments, the bridges comprise substantially optically transmissive material.

FIG. 9B is a side cross-sectional view of a display device including an integrated illumination system 100 comprising a light distribution portion 103 disposed with respect to a plurality of display elements 81. The integrated illumination system 100 includes a light injection portion 101, a light distribution portion 103, a slit 105, and bridges 107. The light distribution portion 103 includes turning microstructures 109. In some embodiments, the turning microstructures include prismatic microstructures as illustrated by FIG. 9B. In certain embodiments, the turning microstructures 109 can be formed directly on the light distribution portion 109 itself. In other embodiments, the turning microstructures 109 are part of a separate turning film. The turning films 108 can comprise, for example, a prismatic film having prismatic turning microstructures. The turning microstructures 109 directs light propagating through the light distribution portion 103 onto the display elements 81. Light reflected from the display elements 81 is then transmitted through and out of the light distribution portion 103.

Figure 10A:
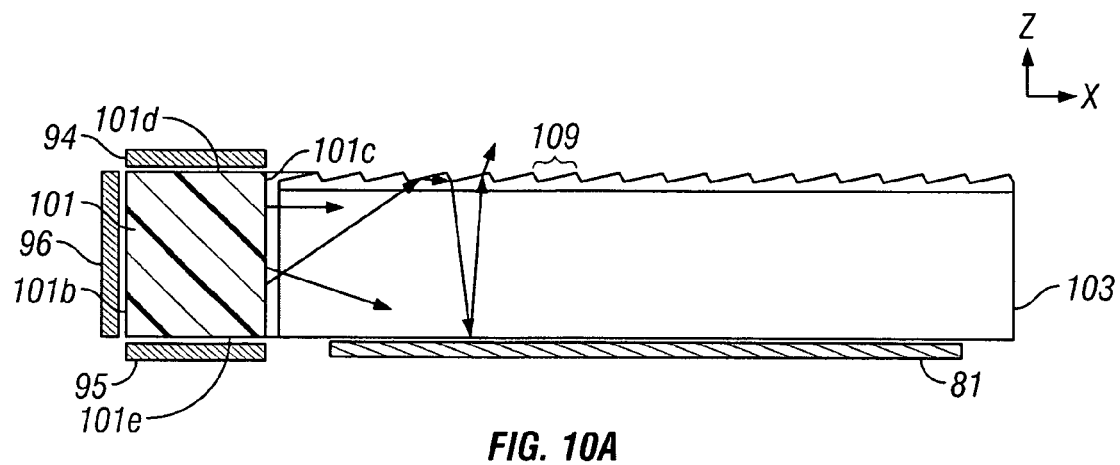
FIG. 10A is a side cross-sectional view of an integrated illumination system additionally comprising one or more reflectors on one or more sides of the light injection portion of the integrated illumination system.
Figure 10B:
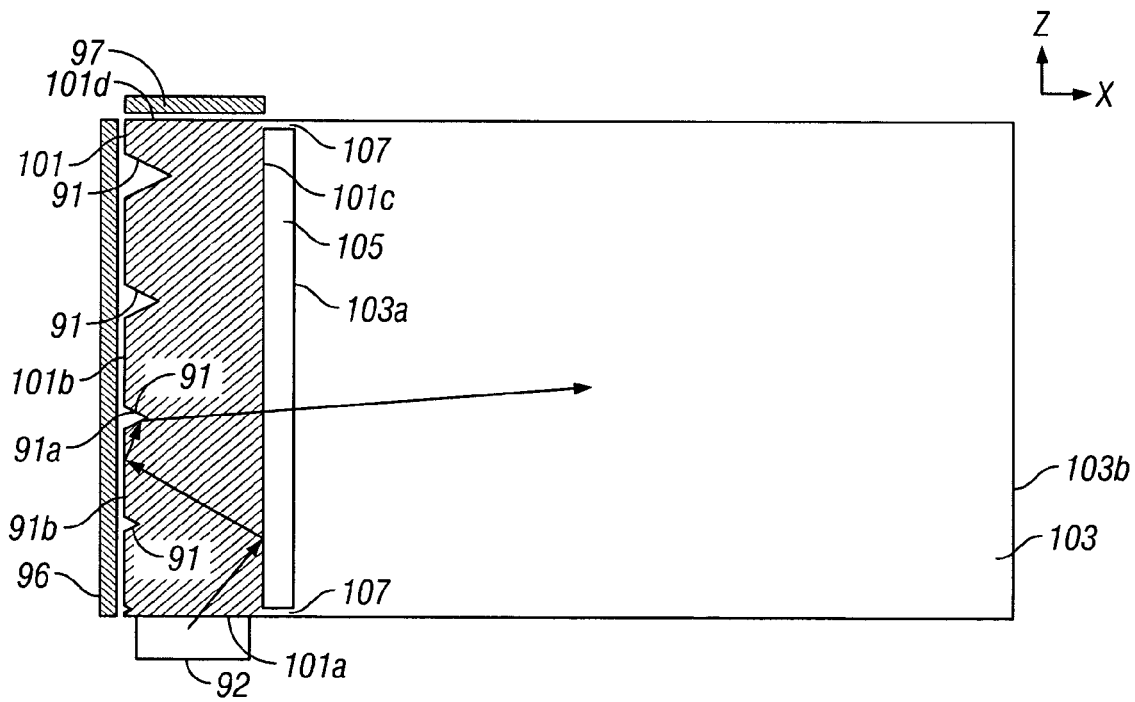
FIG. 10B is a top view of an integrated illumination system additionally comprising one or more reflectors on one or more sides of the light injection portion of the integrated illumination system.

FIGS. 10A and 10B are a side cross sectional view and a top view of an integrated illumination system additionally comprising one or more reflectors on one or more sides of the light injection portion of the integrated illumination system. As illustrated in FIGS. 10A and 10B, the display device comprising the integrated illumination system may additionally comprises one or more reflectors or reflecting portions 94, 95, 96, 97 disposed with respect to the sides (top 101d, bottom 101e, left 101b, and/or back 101f) of the light injection portion 101 of the integrated illumination system. In various embodiments, the reflective surfaces 94, 95, 96, and 97 may comprise planar reflectors, although other shapes are possible. Additionally, the reflectors may comprise diffuse or specular reflectors, although diffuse reflectors may offer the advantage of altering the angle that reflected light returning to the light injection portion 101 propagates therein. In certain embodiments, the reflecting surfaces comprise metal, reflecting paint, or other reflective material. In some embodiments, a dielectric multilayer film (e.g., an interference coating) may be used. An interference coating constructed from dielectric films may advantageously reflect a greater portion of incident light than a metal reflective surface, as metal surfaces may absorb a portion of incident light.

FIG. 11A is a top view of a corner region of the integrated illumination system having one long slit and a pair of bridges illustrating light leakage through one of the bridges. The corner region includes a section of the light injection portion 101, a long slit 105a, a light distribution portion 103, and a bridge 107. In order to form the bridges, the long slit 105a runs nearly across the entire length of the integrated illumination system except at the bridges. The light injection portion receives light 93 emanating from the light source 92. The light 93 comprises reflected light 93a that is incident on and reflected by the optical interface created by the long slit 105a as shown in FIG. 11A. The light 93 further comprises leaked light 93b that passes through the bridge 107 into the light distribution portion without undergoing total internal reflection by the optical interface created by the long slit 105a. The leaked light 93b creates a "hot spot" in the corner region near the light source 92. The hot spot is a location where the intensity of the light directed onto the light modulators is higher. The result is that a viewer sees a region of the display, for example, in the corner, that is brighter than the remainder of the display. This lack of uniformity may be distracting or otherwise degrades from the appearance of the display and the images produced by the display.

FIG. 11B is a top view of a corner region of the integrated illumination system having a long slit and an additional short slit for reducing or eliminating light leakage through a bridge according to certain embodiments. As the example in FIG. 11B illustrates, the corner region of the example embodiment includes an additional short slit 105b along with the long slit 105a similar to the one shown in FIG. 11A. In this arrangement with the additional slit 105b, the portion of the light 93b which would have otherwise leaked into the light distribution portion through the bridge 107 undergoes total internal reflection by another optical interface created by the additional short slit while maintaining the structural integrity of the integrated illumination system structure.

In certain embodiments, the additional short slit 105b is disposed proximal to the bridge 107 and has the same length as the width of the bridge 107 as shown in FIG. 11B. In some embodiments, the width (e.g., in x-direction) of the additional slit 105b has substantially the same width as the wide slit 105a. In some embodiments, the additional slit 105b extends out to an extreme end, e.g., the first end 101a, and another additional short slit may extend to the second opposite end 101d (FIG. 9A) of the light injection portion 101 as shown in FIG. 11B. In some other embodiments, the additional slits 105b do not extend out to the extreme end of the light injection portion, thereby forming additional yet shorter bridges (not shown). The distance (e.g., in x-direction) between the long slit 105a and the additional short slit 105b is preferably between 1 mm and 5 mm. Methods for manufacturing the additional slit 105b are substantially the same as those for manufacturing the long slit 105a described above. For example, the short slits 105 can be formed on film by die-cutting, molding, and embossing.

In certain embodiments, the additional slit 105b may comprise an opening filled with air, gases, or liquid, e.g. adhesive flowed into at least part of the short slit. In various such embodiments, the light injection portion 101 and the additional slit 105b form a high-index to low-index interface. In some embodiments, the high-index to low-index interface comprises a plastic/air interface. The shape of the additional slit is shown as rectangular but may differ. The additional slit may include flat parallel sides such as shown.

Figure 12A:
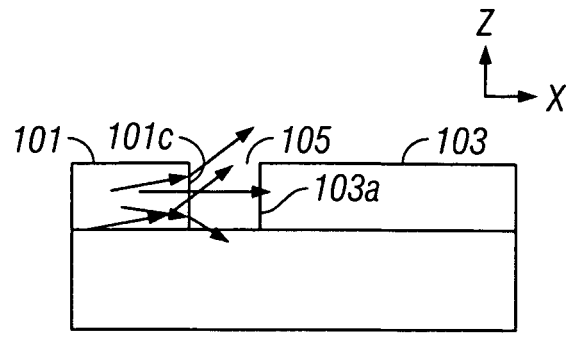
FIG. 12A shows a cross-sectional view of light transmission region in an integrated illumination system showing a slit that is not accompanied by additional light control features.

FIG. 12A shows a cross sectional view of an integrated illumination system light transmission region showing a slit that is not accompanied by additional light control features. As discussed above with reference to FIG. 9B, the slit 105 is bounded by side walls, namely, the second opposite side 101c of the light injection portion 101 and the first side 103a of the light distribution portion 103. The example slit shown in FIG. 12A has featureless flat side walls. As FIG. 12A illustrates, a portion of the light output or transmitted from light injection portion 101 can escape the integrated illumination system without being coupled to the light distribution portion 103, thus reducing the light efficiency of the integrated illumination system.

Figure 12B:
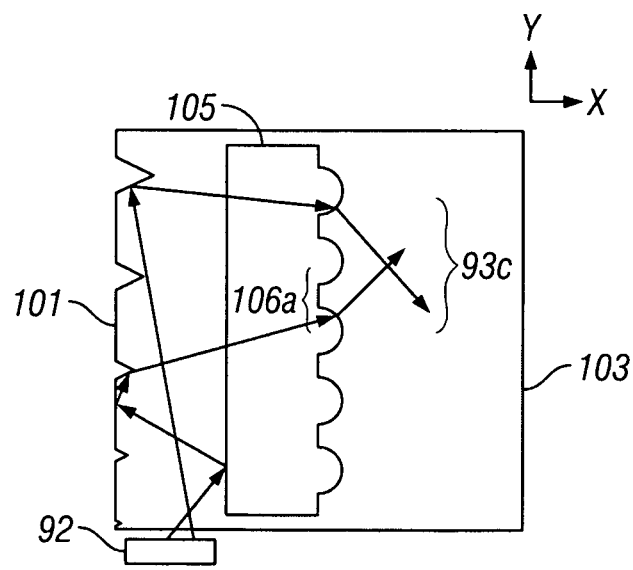
FIG. 12B is a top view of a region of an integrated illumination system showing a slit and additional light control features comprising divergence enhancing features formed on a side wall at the light distribution portion.
Figure 12C:
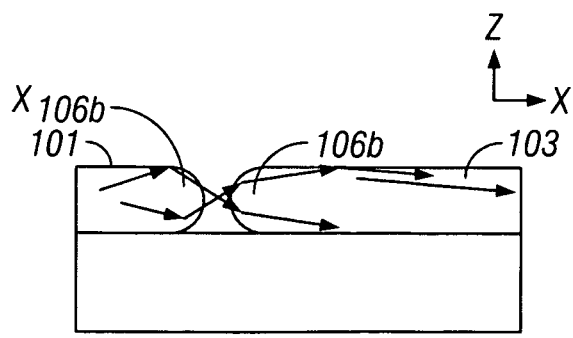
FIG. 12C is a cross-sectional view of a region of an integrated illumination system showing a slit and additional light control features comprising collimation features formed on a side wall at the light injection and light distribution portions.
Figure 12D:
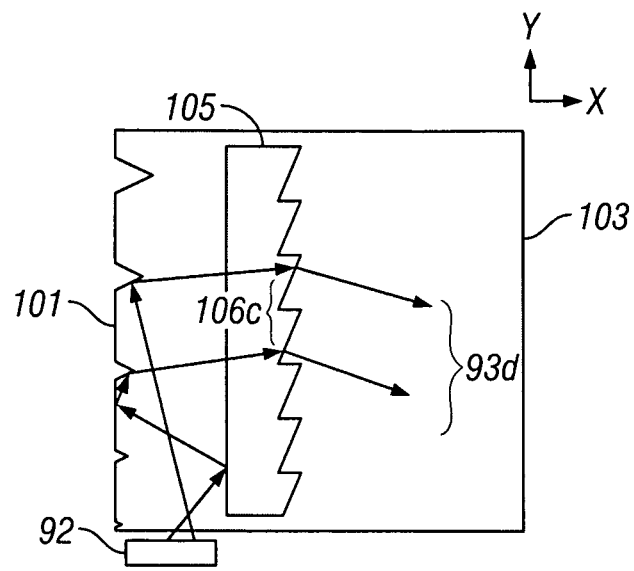
FIG. 12D is a top view of a region of an integrated illumination system showing a slit and additional light control features comprising light deflecting features formed on a side wall at the light distribution portion.

In contrast, FIGS. 12B-D show cross sectional views (12C, 12E) or top views (12B, 12D) of a region near a slit having additional light control feature(s) on or between the side walls according to certain embodiments. In some of the embodiments, the light control feature(s) control the angular direction of the light coupled from the light injection potion into the light distribution portion by changing the direction of the coupled light, e.g., by collimating, diverging, deflecting the light. Such light control features can change the angular behavior of the coupled light in in-plane (y) direction, out-of-the-plane (z), direction, or both. For example, FIG. 12B is a cross sectional view of a region of the integrated illumination system showing a slit and additional light control features comprising divergence enhancing features formed on one of the side walls according to certain embodiments. In certain embodiments, the divergence enhancing features comprise a plurality of concave-shaped features formed on at least one of the side walls. In some embodiments, the divergence enhancing features can include a substantially uniform cross section along the thickness (z) direction of the slit as shown in FIG. 12B. The divergence-enhancing features may comprise various sloping surfaces including planar or curved surfaces. In some embodiments, the redirecting features comprise grooves. The redirecting features may be symmetric or asymmetric. The divergence-enhancing features may have triangular cross-section, e.g., equilateral, isosceles, etc. The divergence-enhancing features may have other shapes as well.

The divergence enhancing features 106a can receive light substantially collimated rays which are transmitted out of the light injection portion at substantially normal propagation angles with respect to the second opposite side 101c of the light injection portion 101 and cause the light to diverge, e.g., in the plane of the light distribution portion, e.g., in the ±y propagation directions of the light rays as they get injected or coupled into the light distribution portion 103. The divergence enhancing features 106a tend to diverge or broaden the in-plane (+/−y) angular distributions of the coupled light rays. Such divergence or broadening can help to achieve a uniformity of light across the light distribution portion.

As another example of a slit having light control features, FIG. 12C is a cross sectional view of a region and the integrated illumination system having additional light control features comprising collimation features 106b formed on side walls according to certain embodiments. In the example shown, the collimation features 106b include a pair of convex-shaped features formed on both of the side walls 101c, 103. The collimation features 106b can help reduce light escaping out of the integrated illumination system (see FIG. 12A) by collimating and reducing divergence in the out-of-the-plane (z) direction a substantial portion of light output or transmitted from the light injection portion 101, and similarly collimating the light injected or coupled into the light distribution portion 103. In some embodiments, the collimation features can include a substantially uniform cross section along the length (y) direction of the slit as shown in FIG. 12C. In some embodiments, the convex-shaped collimation features comprise a cylindrical or other-shaped lens or lenslets. If the lenslets are collimating, the brightness of the display can be increased by the virtue of the fact that a greater portion of the collimated light is turned up (z-direction) towards the viewer. In certain embodiments, in-plane collimation is increased by the collimation features. In other embodiments, out-of-plane collimation is increased by the collimation features.

FIG. 12D is a top view of another integrated illumination system that includes a slit having additional light control features comprising redirecting features 106c formed on one of the side walls, e.g., the first side 103a of the light distribution portion. In certain embodiments, the redirecting features comprise a plurality of sawtooth-shaped features formed on at least one of the side walls as shown in FIG. 12D. In some embodiments, the redirecting features can include a substantially uniform cross section along the thickness (z) direction of the slit. In some embodiments, the redirecting features can include microprisms. The redirecting features may comprise various sloping surfaces including planar or curved surfaces. In some embodiments, the redirecting features comprise grooves. The redirecting features may be symmetric or asymmetric. The redirecting features may have triangular cross-section, e.g., equilateral, isosceles, etc. The redirecting features may have other shapes as well.

In the example shown in FIG. 12D, the redirecting features 106c change the direction of the light rays, e.g., from (+x, +y) direction to (+x, −y) direction as shown in FIG. 12D. The light may be deflected to alter the intensity distribution of illumination of the spatial light modulators. Deflection of the coupled light can be beneficial as the upper edge and corner opposite the light source is often dim. Proper-shaped redirecting features can redirect light into these dim areas.

Figure 12E:
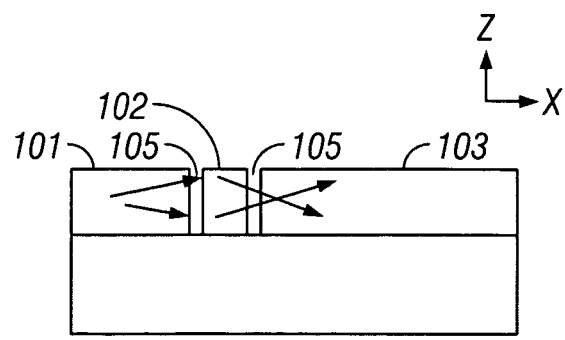
FIG. 12E is a cross-sectional view of a region of an integrated illumination system near a slit having a light control insert placed between side walls of the slit.

In addition or alternative to including features on the walls of the light injection portion and/or light distribution portion, optical elements and/or surfaces can be included within the slit. As yet another example of a slit having additional light control features, FIG. 12E is a cross-sectional view of a region of the integrated illumination system showing a slit having a light control insert 102 placed between the side walls of the slit. In certain embodiments, in order to accommodate the extra light control insert, the width of the slit (e.g., in x-direction) may have to be made larger than what it would have been without the light control insert. In certain embodiments, the light control insert 102 has a rectangular bar shape having flat surfaces such as shown in FIG. 12E. In other embodiments, the light control insert 102 can include differently-shaped surfaces or features. The surfaces may be curved or planar, sloped, symmetric or asymmetric, etc. In some embodiments, the insert 102 may comprise one or more optical elements such as cylindrical lens or a plurality of lenslets or other structure. The light control insert 102 can utilize diffractive or other types of microstructure. By employing one or more of such microstructures, the light control insert can perform one or more of light control functions such as the ones described above. Therefore, by having a combination of light control features, for example, the light control insert can control both in-plane (e.g., x-y plane) and out-of-plane (e.g., z-direction) behaviors of the coupled light.

In addition, while the light control functions described above include the light angle control functions such as collimation, divergence, and deflection, the light control function performed by light control features formed on one or more side walls or on the light control insert can also include other control functions. For example, the light control insert can include a light filtering element to change the color of the coupled light. The light filtering element may transmit a narrow band of wavelengths when white light is incident thereon, thereby producing a color. Such color filter may be an absorptive color filter, wherein wavelengths of light are absorbed thereby filtering the white light and producing a color. Such absorptive filters may comprise for example absorptive material such as dyes. For example, the slit can be coated with dye molecules or quantum dots that convert UV light into R,G,B colors more appropriate for the display. Alternatively, the filters may comprise fluorescent material wherein incident light causes the element to fluoresce at one or more wavelengths, thereby producing a color. The incident light may, for example, be white light, ultraviolet (UV) light, etc.

As discussed above with reference to FIG. 11A, the presence of the bridges can cause some light to leak into the light distribution portion, and such leaked light can create a "hot spot" in the corner region near the light source 92. The light leakage can also produce inefficiency and/or performance degradation as the leaked light does not get subjected to various efficiency/performance-enhancing features of the integrated illumination system. For example, the leaked light portion does not get controllably directed to the light distribution portion by the turning microstructure and may create an uneven distribution of light across the light distribution portion, illuminating certain parts of the light distribution portion more than others. As discussed above with reference to FIGS. 12B-12D, the slit may include certain light control features formed on the side walls to collimate, diverge, or change direction of the light transmitted through the slit, for example. In some embodiments, the light control features may change wavelength distribution of the light. The leaked light portion does not pass through the light control features, at least partially defeating particular benefits that the light control features are designed to engender.

A wide variety of variations are possible. Films, layers, components, features, structures, and/or elements may be added, removed, or rearranged. Additionally, processing steps may be added, removed, or reordered.

Moreover, although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while several variations of the invention have been shown and described in detail, other modifications, which are within the scope of this invention, will be readily apparent to those of skill in the art based upon this disclosure. It is also contemplated that various combinations or subcombinations of the specific features and aspects of the embodiments may be made and still fall within the scope of the invention. It should be understood that various features and aspects of the disclosed embodiments can be combined with, or substituted for, one another in order to form varying modes of the disclosed invention. Thus, it is intended that the scope of the present invention herein disclosed should not be limited by the particular disclosed embodiments described above, but should be determined only by a fair reading of the claims that follow.

What is claimed is:

1. An integrated illumination apparatus comprising:
   a light injection portion having a first end for receiving light from a light source located at the first end of the light injection portion, wherein the light injection portion has a length, said light injection portion comprising material that supports propagation of said light along the length of the light injection portion towards a second opposite end;
   turning microstructure disposed on a first side of the light injection portion, the turning microstructure configured to turn at least a substantial portion of light incident on the first side and to direct the portion of the light towards a second opposite side of the light injection portion, wherein a width dimension of the light injection portion extends from the first side to the second side orthogonal to the length of the light injection portion;
   a slit disposed along the length of the light injection portion, the slit forming an optical interface on the second opposite side of the light injection portion that provides total internal reflection for light propagating along the length of the light injection portion to be guided therein, said optical interface further transmitting light turned by said turning microstructure, the slit including two sidewalls, one or both of the sidewalls including one or both of: a plurality of curved light control features defined by curves extending in a length dimension of the slit, and one or more curved light control features defined by curves extending substantially in a thickness dimension of the light injection portion, the thickness dimension orthogonal to both the length and the width dimension of the light injection portion;
   a light distribution portion disposed with respect to the slit to receive the light turned by said turning microstructure and transmitted out of the second side of the light injection portion and through said slit; and
   at least one bridge disposed between light injection portion and the light distribution portion and mechanically connecting the light injection portion to the light distribution portion.

2. The integrated illumination apparatus of claim 1, wherein the light injection portion, the light distribution portion, and the bridge comprise a monolithic film.

3. The integrated illumination apparatus of claim 1, wherein the at least one bridge is disposed proximal to the first end of the light injection portion.

4. The integrated illumination apparatus of claim 1, wherein the at least one bridge is disposed proximal to the second opposite end of the light injection portion.

5. The integrated illumination apparatus of claim 1, wherein the at least one bridge comprises two bridges disposed proximal to the first end and the second opposite end of the light injection portion.

6. The integrated illumination apparatus of claim 1, wherein the turning microstructure comprises a plurality of faceted features formed directly into of the light injection portion.

7. The integrated illumination apparatus of claim 6, wherein the faceted features comprise a plurality of grooves formed directly into the light injection portion.

8. The integrated illumination apparatus of claim 7, wherein the grooves comprise a plurality of triangular grooves having substantially triangular cross-sections.

9. The integrated illumination apparatus of claim 1, further comprising an additional slit displaced from the slit laterally along the length of the integrated illumination apparatus, and disposed with respect to the bridge to provide total internal reflection for a portion of light that would have otherwise leaked into the bridge.

10. The integrated illumination apparatus of claim 9, wherein the additional slit is disposed proximal to the bridge and has substantially the same length as the width of the bridge.

11. The integrated illumination apparatus of claim 1, wherein the light control features control the angular direction of the light transmitted from the light injection portion into the light distribution portion.

12. The integrated illumination apparatus of claim 11, wherein the light control features comprise a convex-shaped feature formed on at least one of the side walls.

13. The integrated illumination apparatus of claim 11, wherein the light control features comprise a cylindrical lens.

14. The integrated illumination apparatus of claim 1, wherein the light control features increase collimation of the transmitted light.

15. The integrated illumination apparatus of claim 1, wherein the light control features increase in-plane collimation of the transmitted light.

16. The integrated illumination apparatus of claim 1, wherein the light control features increase out-of-plane collimation of the transmitted light.

17. The integrated illumination apparatus of claim 1, wherein the light control features increase divergence of the transmitted light.

18. The integrated illumination apparatus of claim 17, wherein the light control features comprise a plurality of concave-shaped features formed on at least one of the side walls.

19. The integrated illumination apparatus of claim 1, wherein the light control features deflect the transmitted light.

20. The integrated illumination apparatus of claim 19, wherein the light control features comprise a plurality of sawtooth-shaped features formed on at least one of the side walls, wherein the sawtooth-shaped features comprise a substantially uniform cross section along the thickness direction of the slit.

21. The integrated illumination apparatus of claim 19, wherein the light control features comprise microprisms.

22. The integrated illumination apparatus of claim 19, wherein the light control features change the color of the light transmitted from the light injection portion into the light distribution portion.

23. The integrated illumination apparatus of claim 1, further comprising a light control insert placed in the slit.

24. The integrated illumination apparatus of claim 23, wherein the light control insert comprises a bar.

25. The integrated illumination apparatus of claim 24, wherein the light control insert comprises a uniform rectangular cross section along the length direction of the slit.

26. The integrated illumination apparatus of claim 23, wherein the light control insert controls the angular direction of the light transmitted from the light injection portion into the light distribution portion.

27. The integrated illumination apparatus of claim 2, wherein the light control insert comprises a uniform flat surface along the length direction of the slit.

28. The integrated illumination apparatus of claim 23, wherein the light control insert increases collimation of the transmitted light.

29. The integrated illumination apparatus of claim 23, wherein the light control insert increases divergence of the transmitted light.

30. The integrated illumination apparatus of claim 23, wherein the light control insert redirects the transmitted light.

31. The integrated illumination apparatus of claim 23, wherein the light control insert changes the color of the light transmitted from the light injection portion into the light distribution portion.

32. The integrated illumination apparatus of claim 1, wherein the light injection portion further comprises at least one reflective surface disposed with respect to a side of the light injection portion to receive light transmitted therethrough.

33. The integrated illumination apparatus of claim 1, wherein the light distribution portion is disposed with respect to a plurality of spatial light modulators to illuminate the plurality of spatial light modulators.

34. The integrated illumination apparatus of claim 33, wherein the plurality of spatial light modulators comprises an array of interferometric modulators.

35. The integrated illumination apparatus of claim 33, further including a substrate comprising the plurality of spatial light modulators.

36. The integrated illumination apparatus of claim 35, wherein the light injection portion is at least in part laminated to the substrate via an adhesive.

37. The integrated illumination apparatus of claim 35, wherein the light injection portion is at least in part disposed with respect to the substrate via an air gap.

38. The integrated illumination apparatus of claim 1, further comprising:

display elements, wherein the light distribution portion is configured to illuminate the display elements;

a processor that is configured to communicate with said display elements, said processor being configured to process image data; and a memory device that is configured to communicate with said processor.

39. The integrated illumination apparatus of claim 38, further comprising a driver circuit configured to send at least one signal to the display elements.

40. The integrated illumination apparatus of claim 39, further comprising a controller configured to send at least a portion of the image data to the driver circuit.

41. The integrated illumination apparatus of claim 38, further comprising an image source module configured to send said image data to said processor.

42. The integrated illumination apparatus of claim 41, wherein the image source module comprises at least one of a receiver, transceiver, and transmitter.

43. The integrated illumination apparatus of claim 38, further comprising an input device configured to receive input data and to communicate said input data to said processor.

44. The integrated illumination apparatus of claim 1, wherein both sidewalls of the slit include one or more curved light control features.

45. The integrated illumination apparatus of claim 44, wherein both sidewalls of the slit include convex light control features curving outwards toward one another.

46. The integrated illumination apparatus of claim 45, wherein the convex light control features are configured to collimate light.

47. An illumination apparatus comprising:

means for injecting light having means for receiving light from a means for emitting light located at a first end of the means for injecting light, said light injecting means comprising means for supporting propagation of said light along a length of the light injecting means towards a second end of said light injecting means;

means for turning light disposed on a first side of the light injecting means, the light turning means configured to turn at least a substantial portion of light incident on the first side and to direct the portion of the light towards a second opposite side of the light injecting means;

means for providing total internal reflection for light propagating along the length of the light injecting means to be guided therein, said total internal reflection providing means disposed along the length of the light injecting means on the second opposite side of the light injecting means, said total internal reflection providing means further transmitting light turned by said light turning means, wherein a width dimension of the light injecting means extends from the first side of the light injecting means to the second side of the light injecting means, the total internal reflection providing means having one or both of: a plurality of curved light control features defined by curves extending in a length dimension of the light injecting means, and one or more curved light control features defined by curves extending substantially in a thickness dimension of the light injecting means, the thickness dimension orthogonal to both the length and the width dimension of the light injecting means;

means for distributing light disposed with respect to the total internal reflection providing means to receive the light from said light turning means and transmitted out of the second side of the light injecting means and through said total internal reflection providing means; and means for mechanically connecting disposed between and mechanically connecting the light injecting means and the light distribution means.

48. The illumination apparatus of claim 47, wherein said light injecting means comprises a light injection portion or said light receiving means comprises the first end of said light injecting means and said second end toward which said light propagates along the length of said light injecting means comprises a second opposite end of said light injecting means or said light emitting means comprises a light source or said light propagation supporting means comprises material that supports propagation of said light or said light turning means comprises turning microstructures or said total internal reflection providing means comprises a slit or an optical interface or said light distributing means comprises a light distribution portion or said mechanically connecting means comprises at least one bridge.

* * * * *